Figure 4:
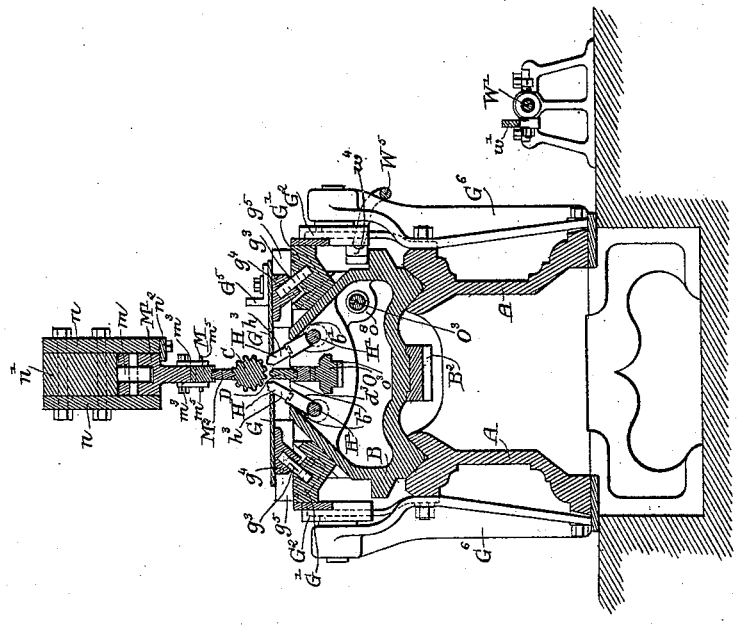

(No Model.) 13 Sheets—Sheet 1.
O. P. BRIGGS.
PIPE MAKING MACHINE.
No. 430,265. Patented June 17, 1890.
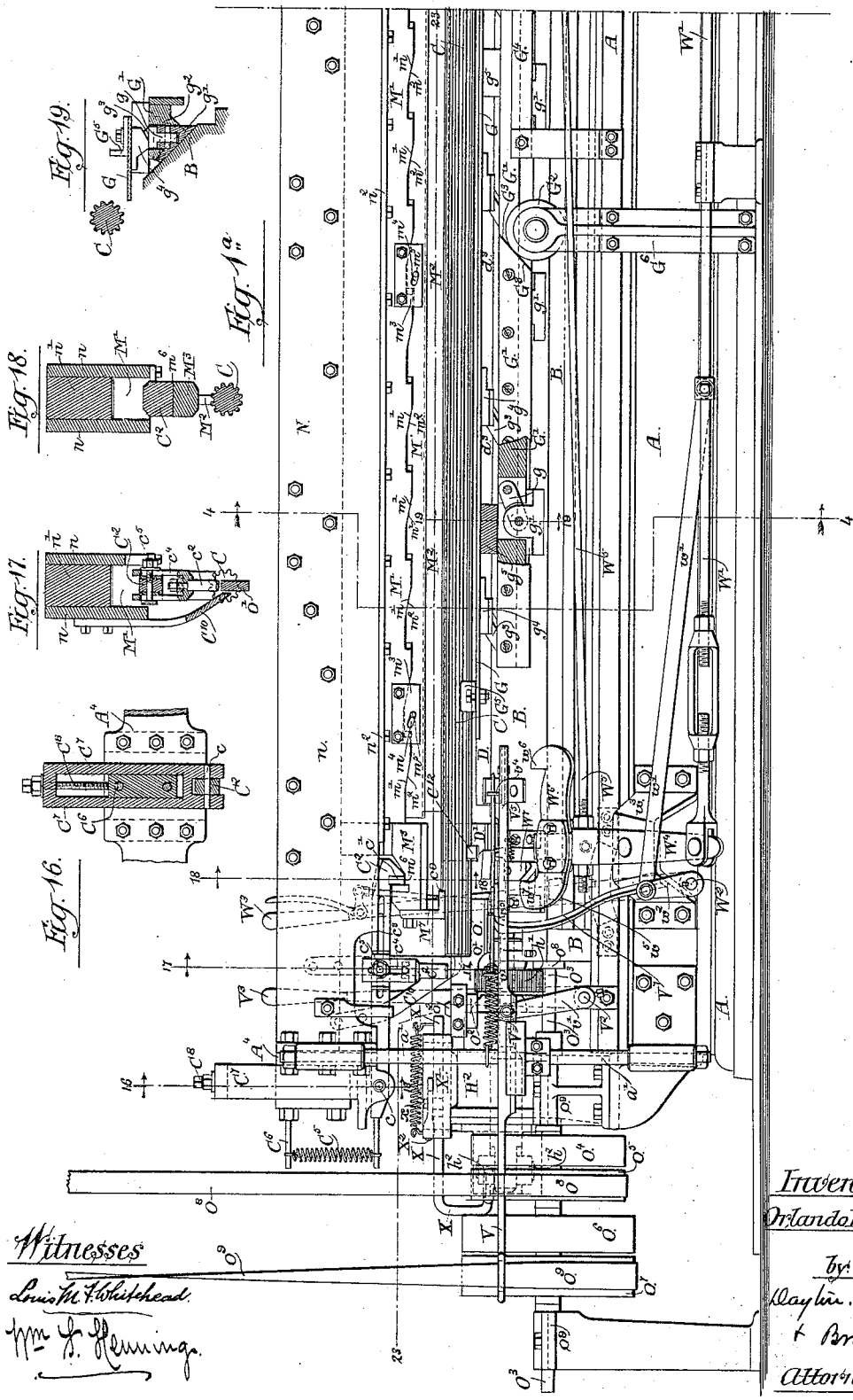
Witnesses
Louis M. F. Whitehead
Wm. S. Henning
Inventor:—
Orlando P. Briggs
by:—
Daylin. Poole
& Brown
Attorneys.

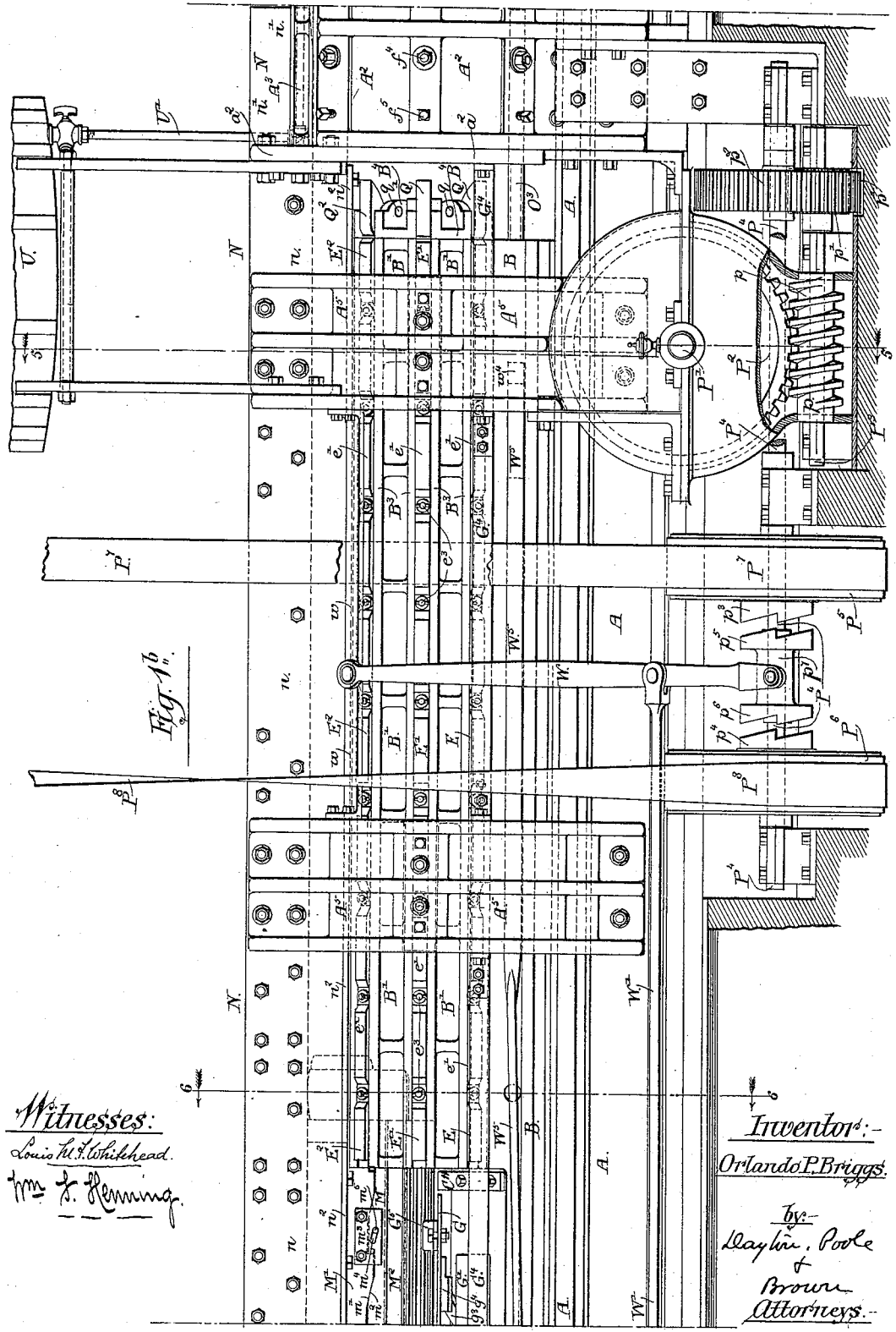

(No Model.) 13 Sheets—Sheet 3.
O. P. BRIGGS.
PIPE MAKING MACHINE.
No. 430,265. Patented June 17, 1890.
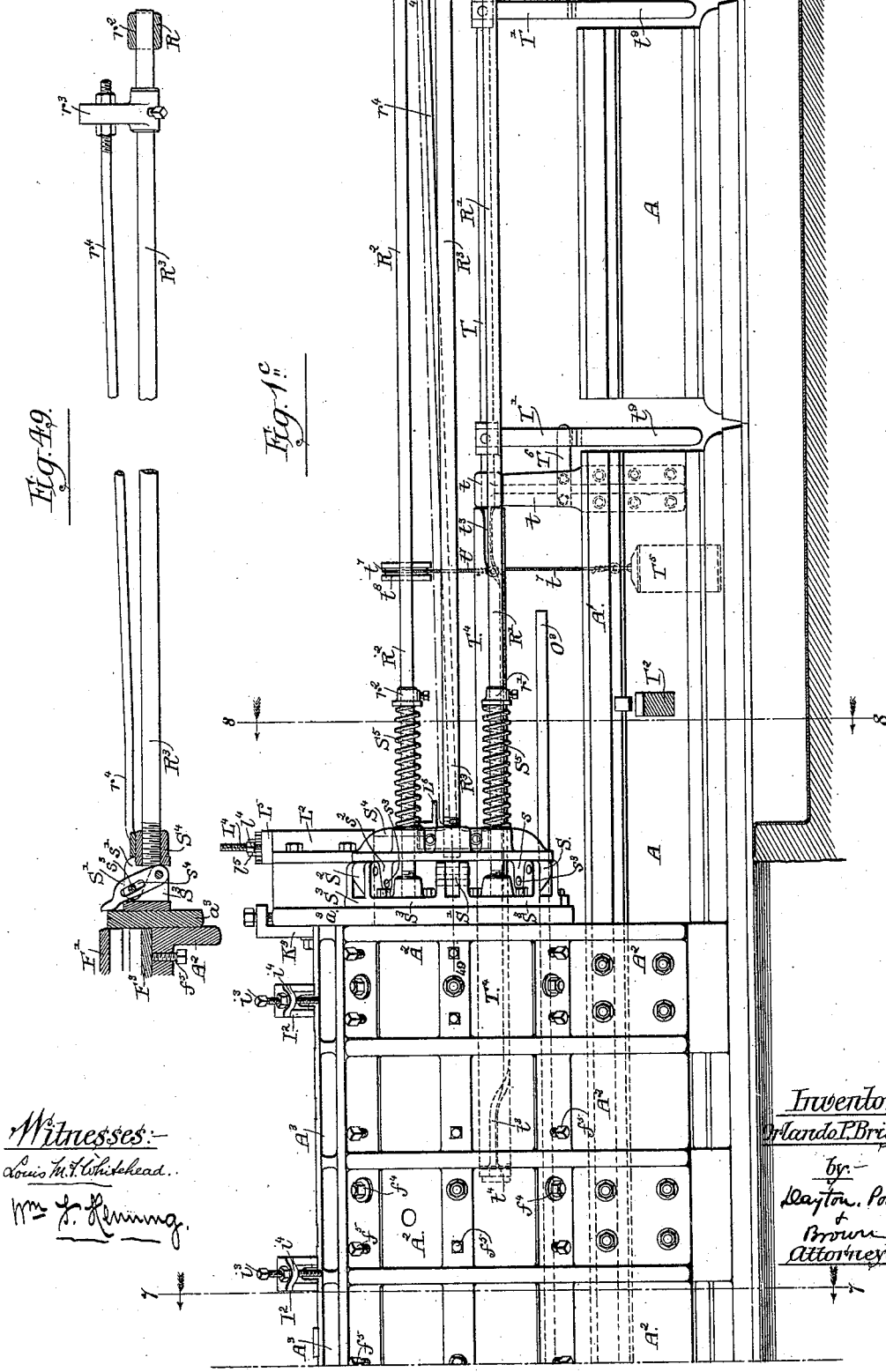
Witnesses:
Louis M. F. Whitehead
Wm. F. Henning
Inventor:—
Orlando P. Briggs
by:—
Dayton, Poole
& Brown
Attorneys (No Model.) 13 Sheets—Sheet 4.
O. P. BRIGGS.
PIPE MAKING MACHINE.
No. 430,265. Patented June 17, 1890.
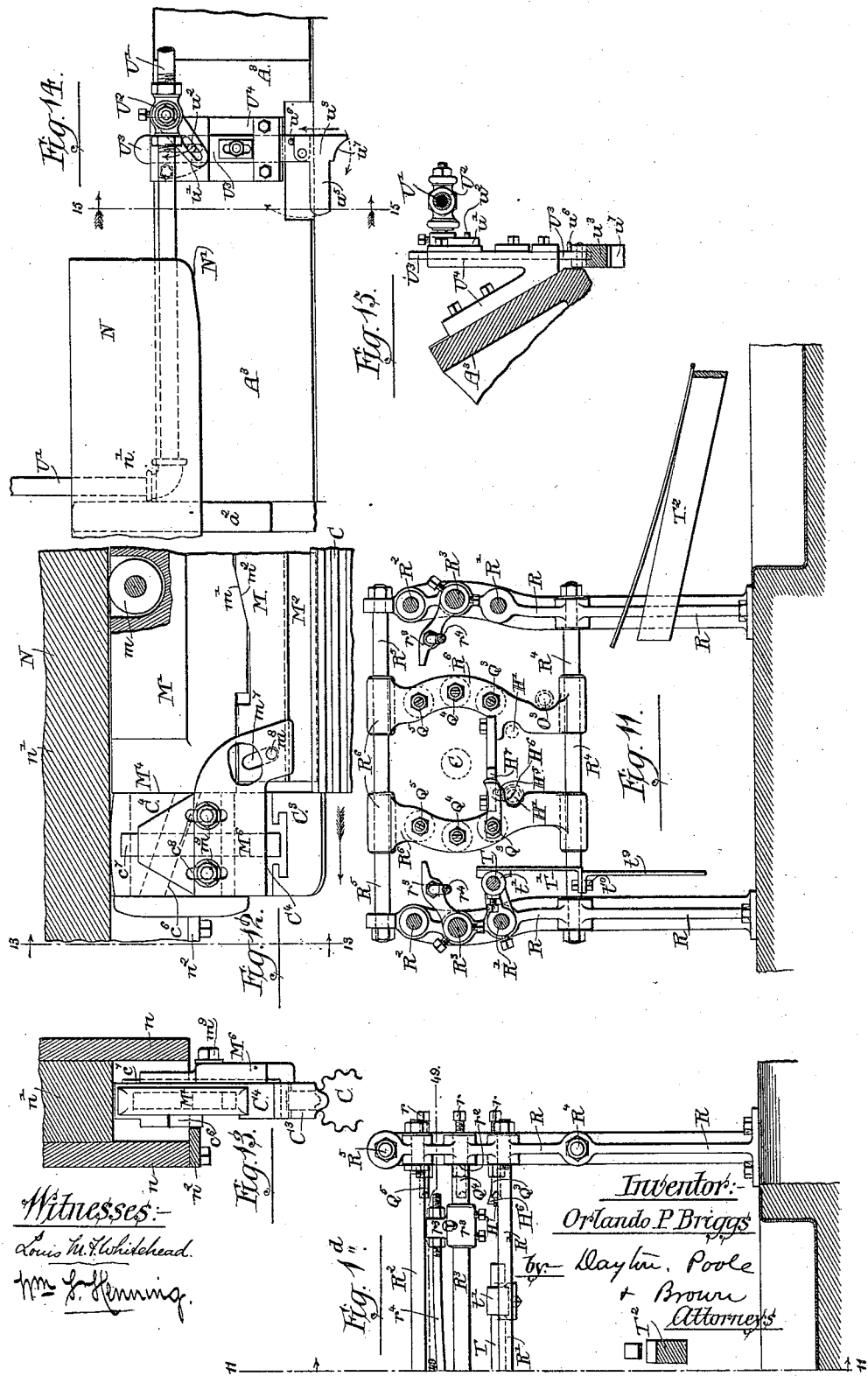

(No Model.) 13 Sheets—Sheet 5.
O. P. BRIGGS.
PIPE MAKING MACHINE.
No. 430,265. Patented June 17, 1890.
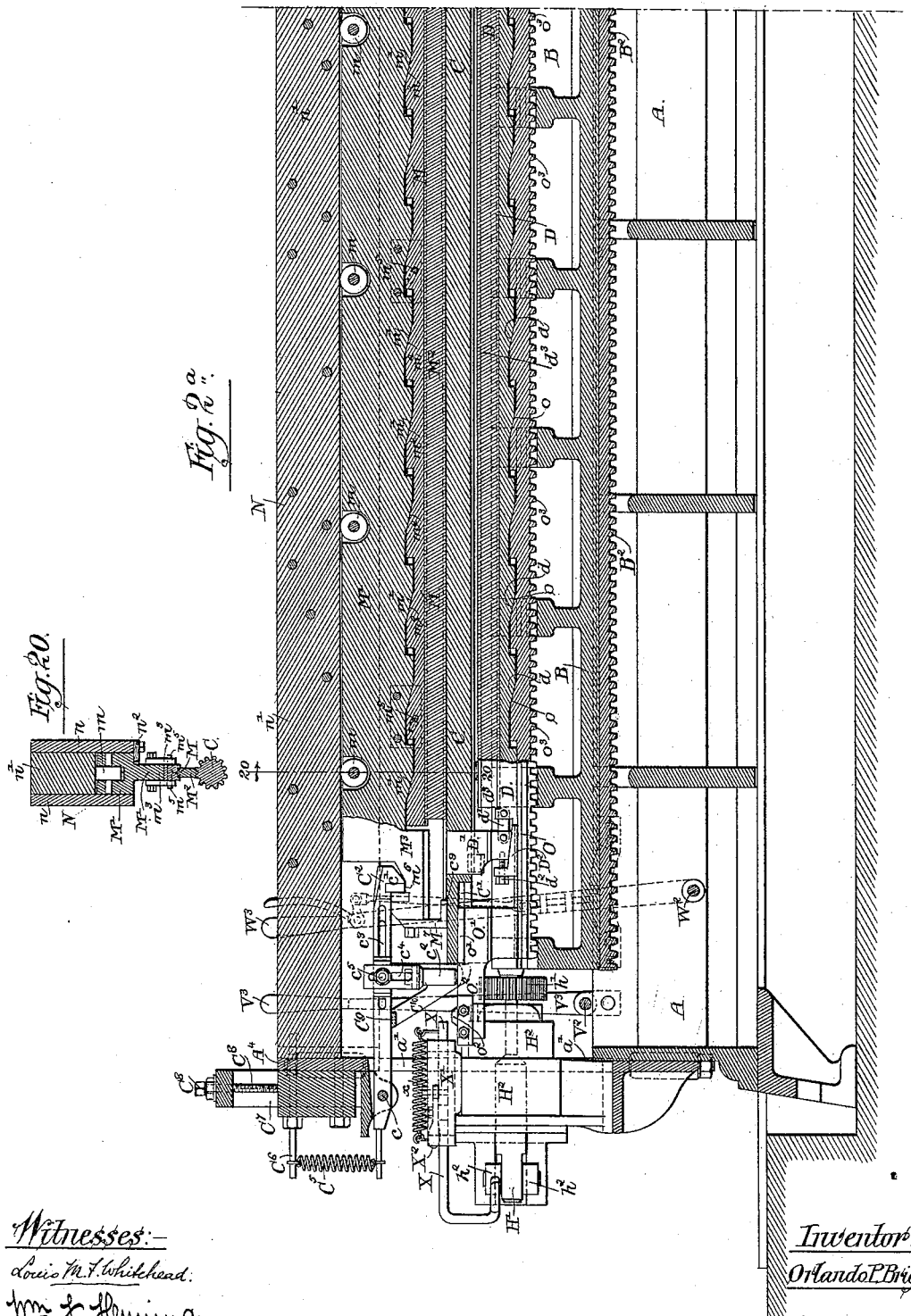
Witnesses:
Louis M. F. Whitehead
Wm. F. Fleming
Inventor:
Orlando P. Briggs
By Dayton, Poole & Brown
Attorneys

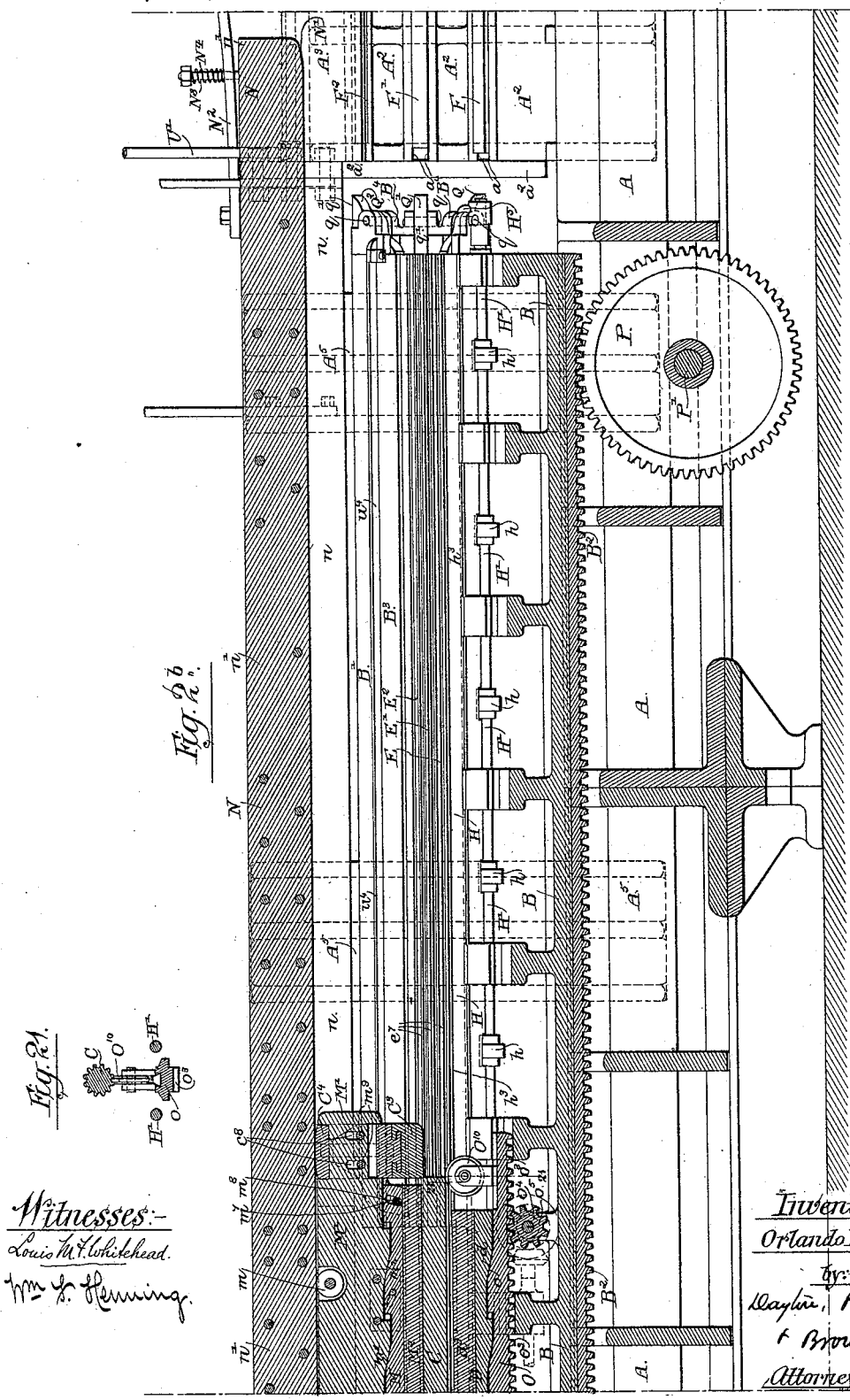

(No Model.) 13 Sheets—Sheet 7.
O. P. BRIGGS.
PIPE MAKING MACHINE.
No. 430,265. Patented June 17, 1890.
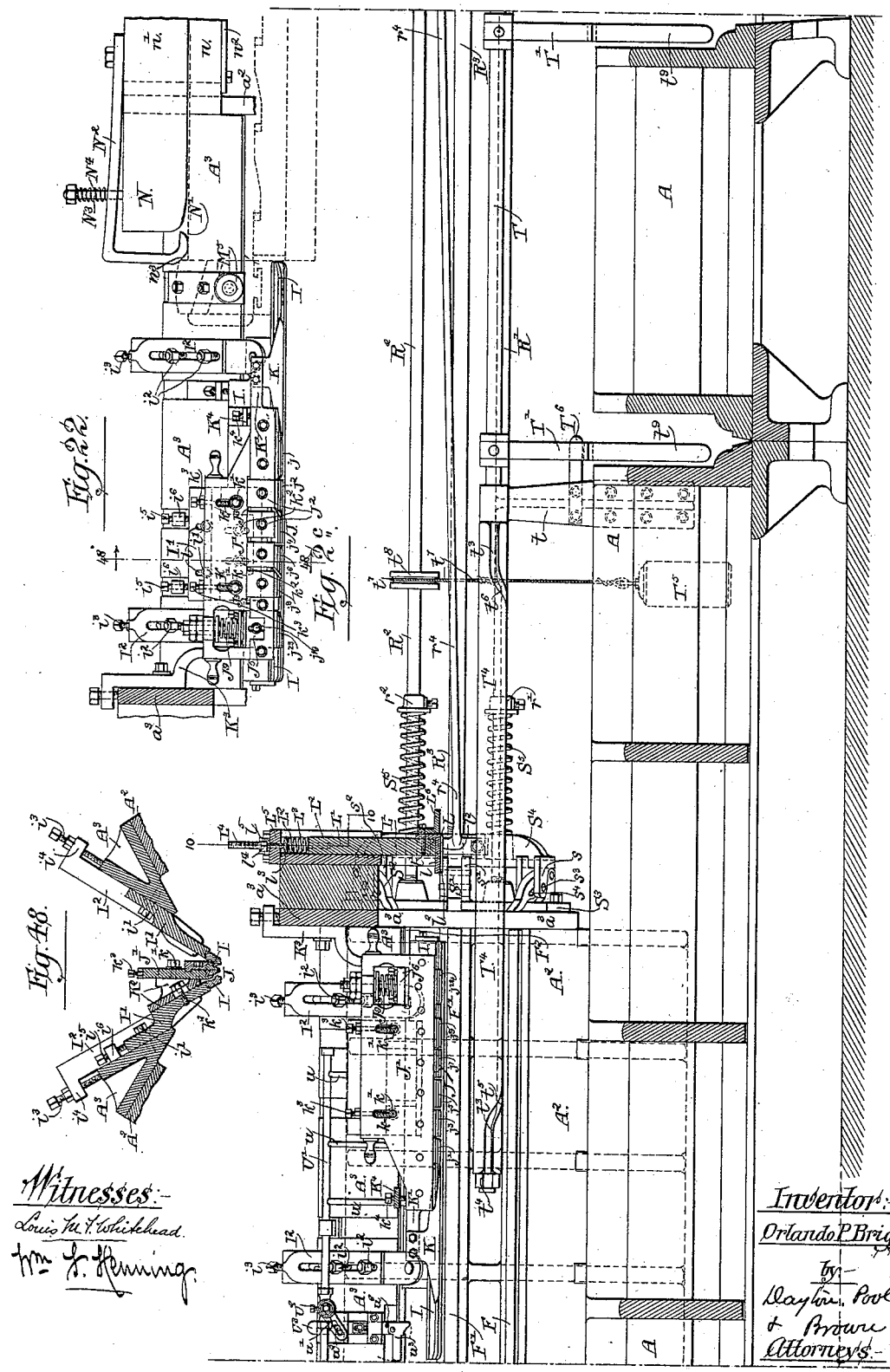
Witnesses:—
Louis M. F. Whitehead
Wm. F. Henning
Inventor:—
Orlando P. Briggs
by
Dayton, Poole
& Brown
Attorneys

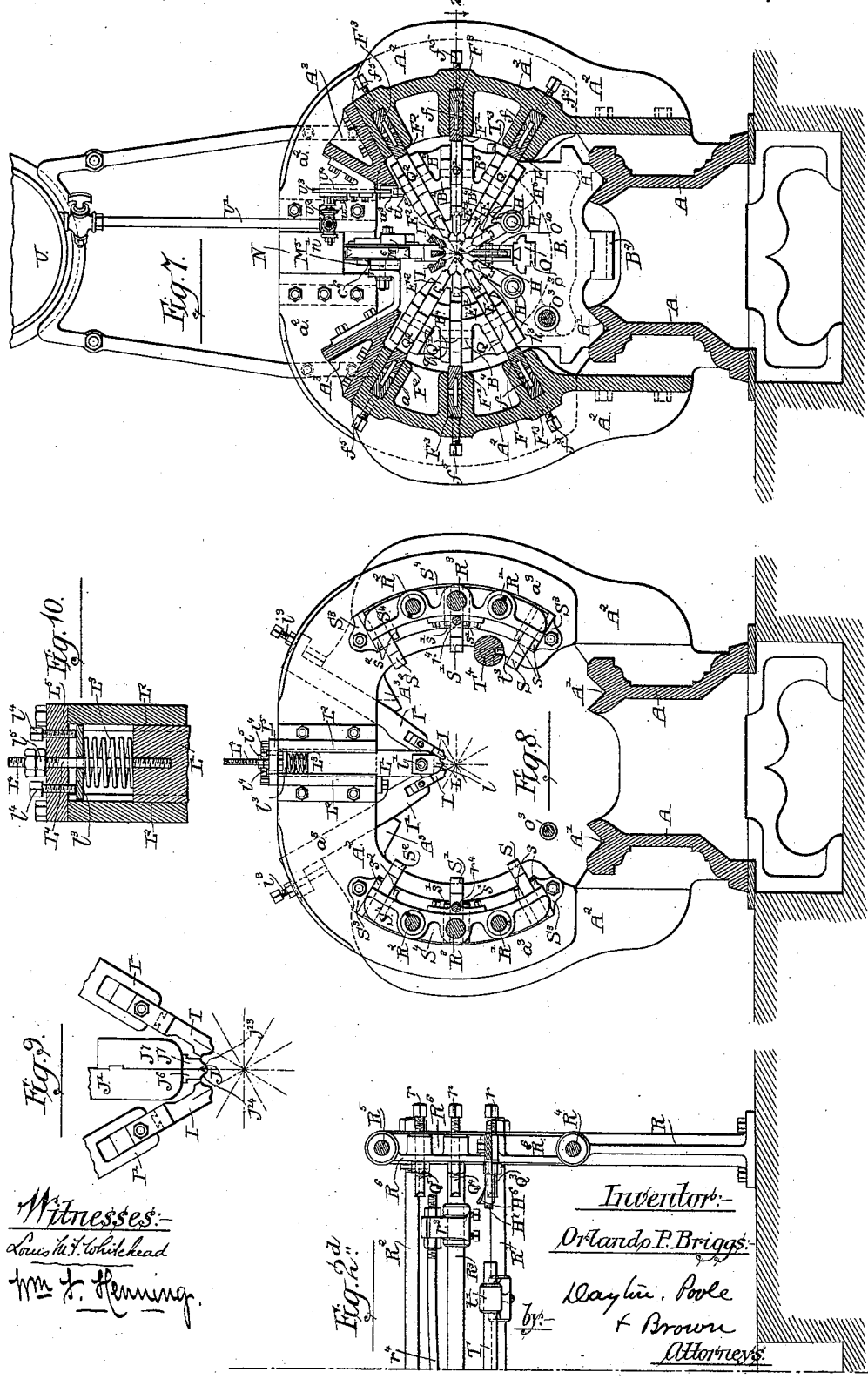

(No Model.) 13 Sheets—Sheet 9.

O. P. BRIGGS.
PIPE MAKING MACHINE.

No. 430,265. Patented June 17, 1890.

Witnesses:
Louis M. F. Whitehead.
Wm. F. Henning.

Inventor:
Orlando P. Briggs.
by Dayton, Poole & Brown
Attorneys.

(No Model.)

13 Sheets—Sheet 10.

O. P. BRIGGS.
PIPE MAKING MACHINE.

No. 430,265.   Patented June 17, 1890.

Witnesses:—
Louis M. Whitehead.
Wm. J. Henning.

Inventor:—
Orlando P. Briggs.
by Dayton, Poole, & Brown
Attorneys.

(No Model.) 13 Sheets—Sheet 11.

O. P. BRIGGS.
PIPE MAKING MACHINE.

No. 430,265. Patented June 17, 1890.

Witnesses:
Louis M. F. Whitehead
Wm. F. Hemming

Inventor:
Orlando P. Briggs
by Dayton, Poole & Brown
Attorneys.

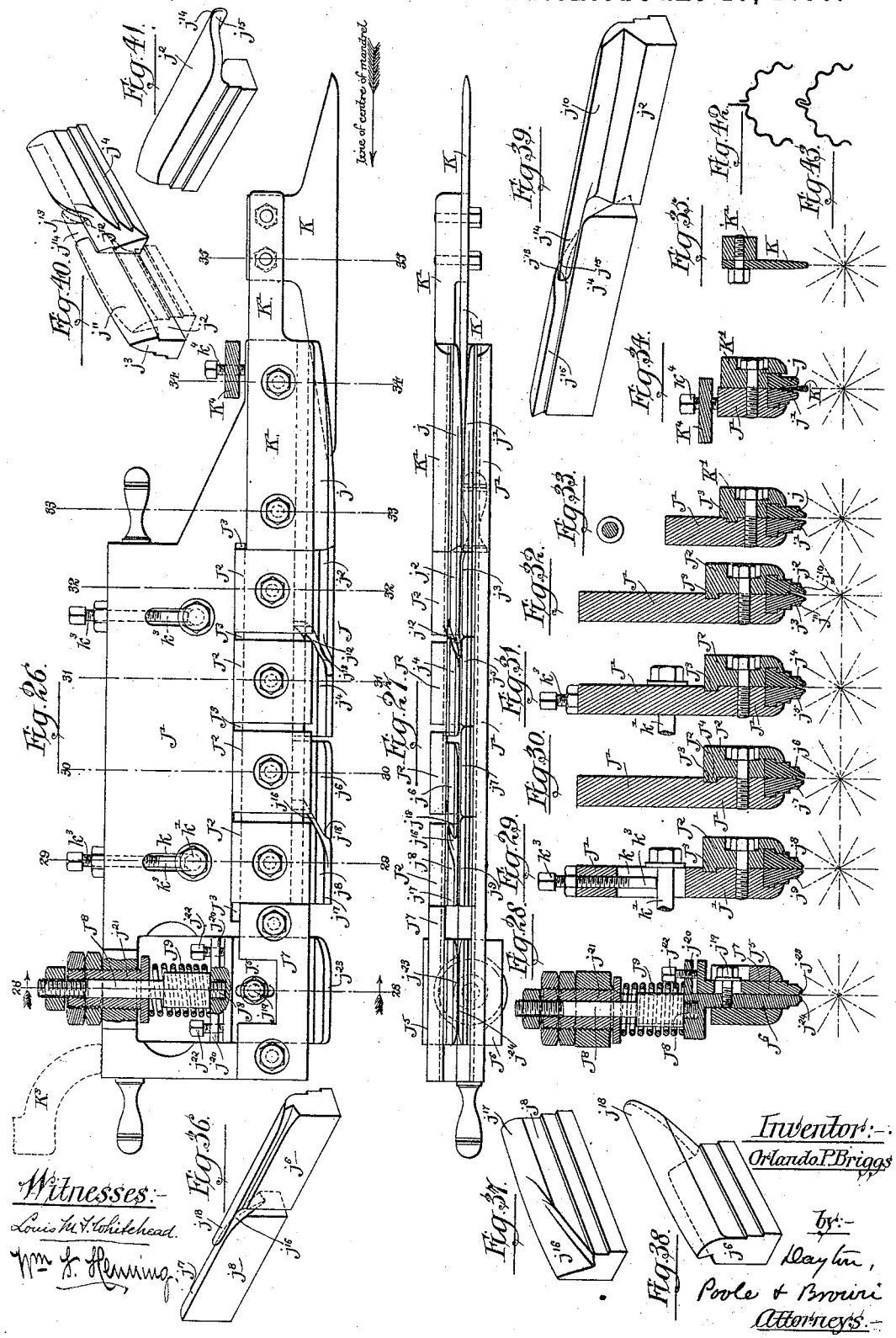

(No Model.)  13 Sheets—Sheet 13.
O. P. BRIGGS.
PIPE MAKING MACHINE.
No. 430,265. Patented June 17, 1890.
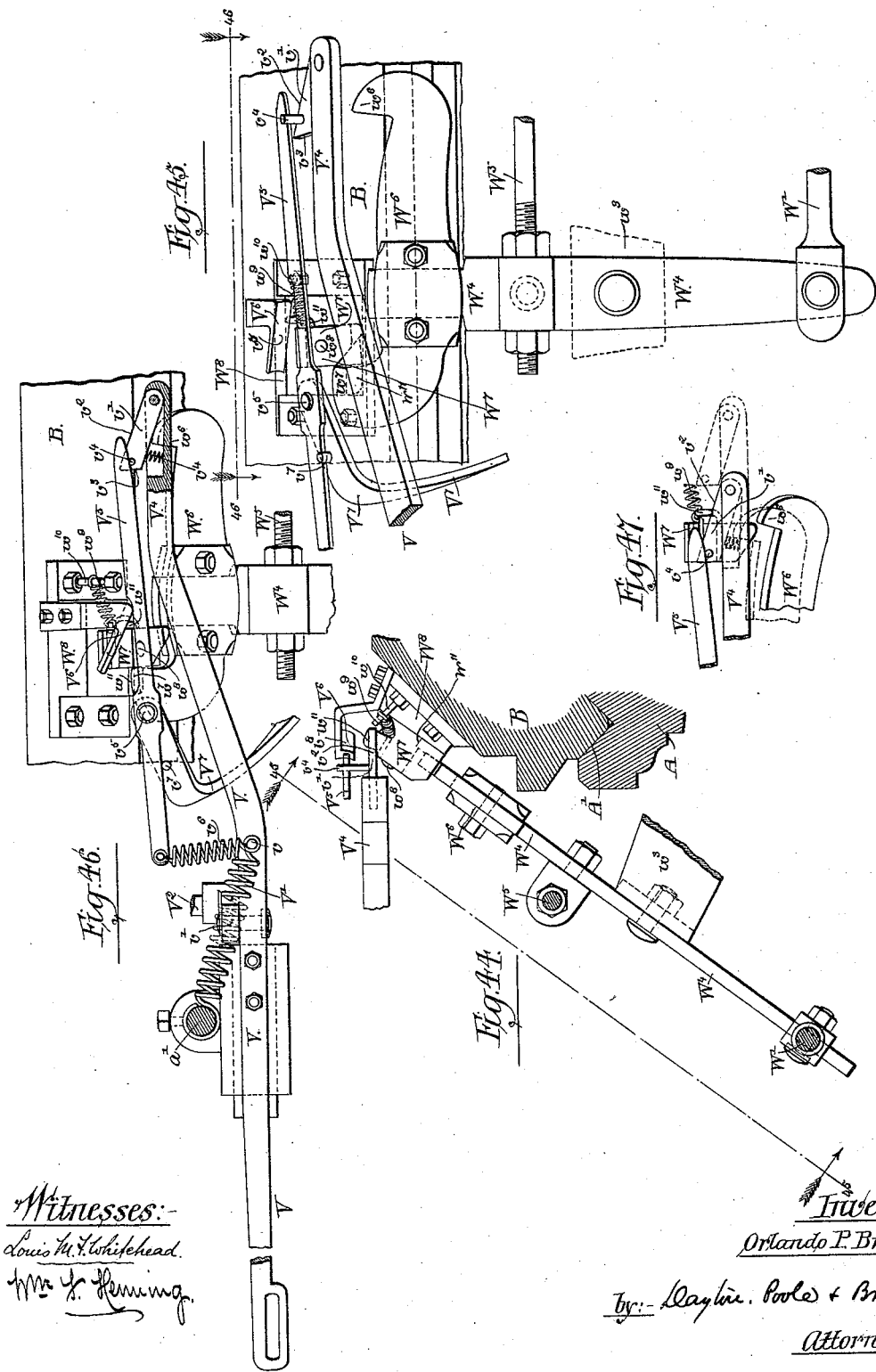
Witnesses:
Louis M. T. Whitehead
Wm. T. Fleming
Inventor:
Orlando P. Briggs
by Dayton, Poole & Brown
Attorneys

UNITED STATES PATENT OFFICE.

ORLANDO P. BRIGGS, OF CHICAGO, ILLINOIS, ASSIGNOR, BY DIRECT AND MESNE ASSIGNMENTS, TO JAMES A. MILLER AND ROBERT B. MILLER, OF SAME PLACE.

PIPE-MAKING MACHINE.

SPECIFICATION forming part of Letters Patent No. 430,265, dated June 17, 1890.

Application filed April 23, 1888. Serial No. 271,526. (No model.)

*To all whom it may concern:*

Be it known that I, ORLANDO P. BRIGGS, of Chicago, in the county of Cook and State of Illinois, have invented certain new and useful Improvements in Pipe-Making Machines; and I do hereby declare that the following is a full, clear, and exact description thereof, reference being had to the accompanying drawings, and to the letters of reference marked thereon, which form a part of this specification.

This invention relates to an improved machine for the manufacture of sheet-metal pipe or tubing, and embraces improvements in the devices both for seaming the tubing and for longitudinally corrugating the same.

The main features of construction of the machine herein shown are similar to those of the machine illustrated, described, and claimed in the prior application, Serial No. 182,168, filed November 9, 1885, and the present application embraces, mainly, improvements in the said machine.

The invention consists in the matters hereinafter described, and pointed out in the appended claims.

Figure 3:
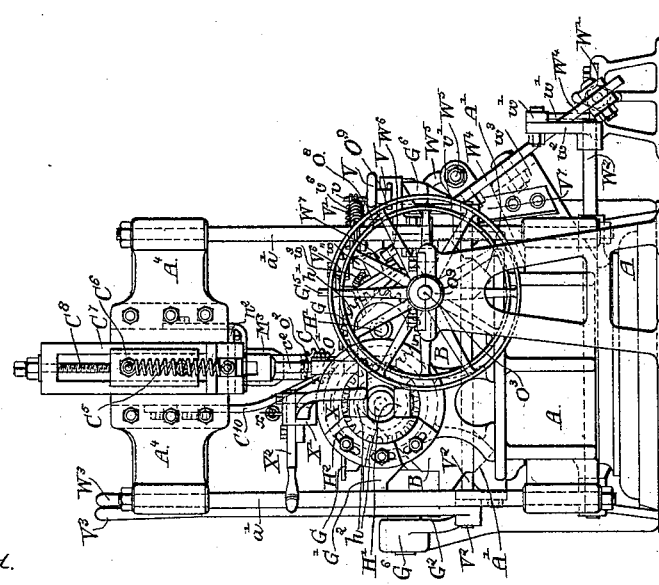
Figure 6:
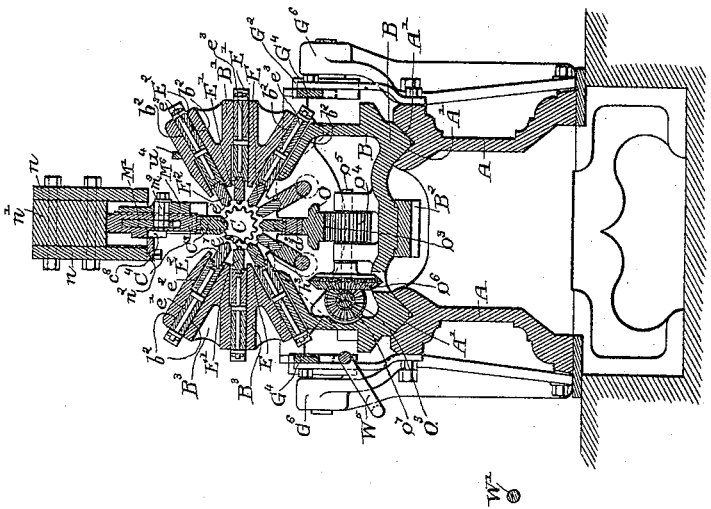
Figure 5:
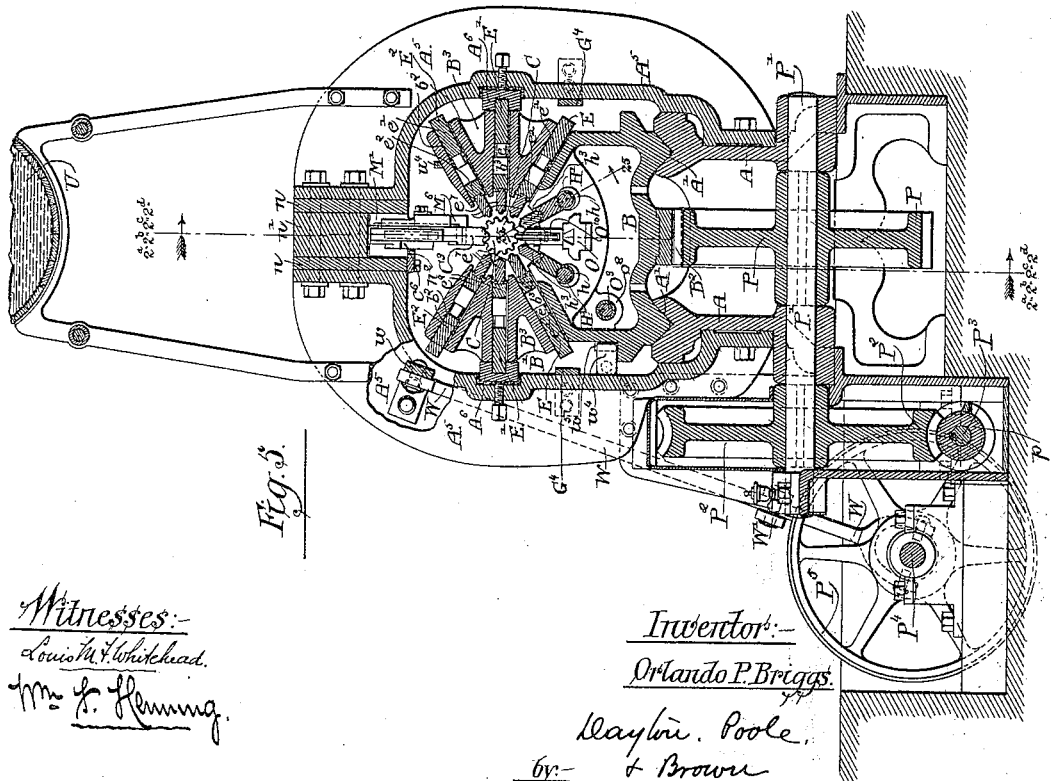
Figure 24:
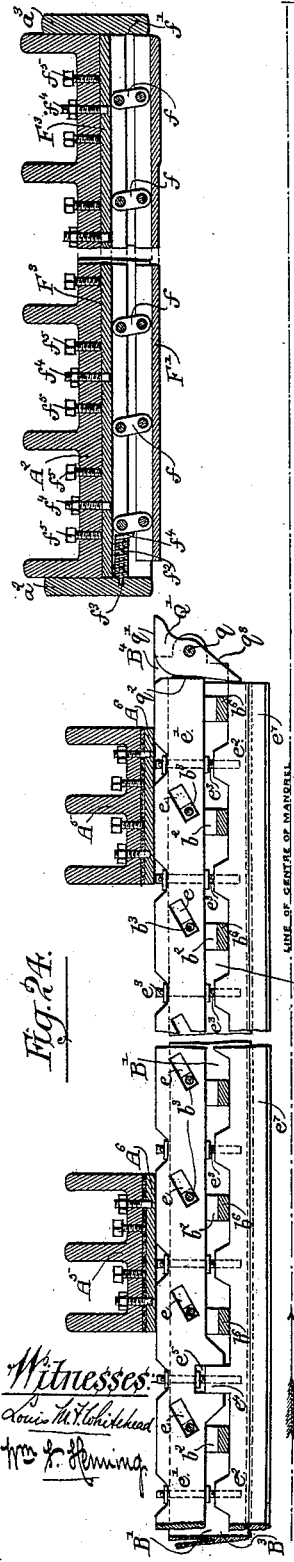
Figures 23, 25:
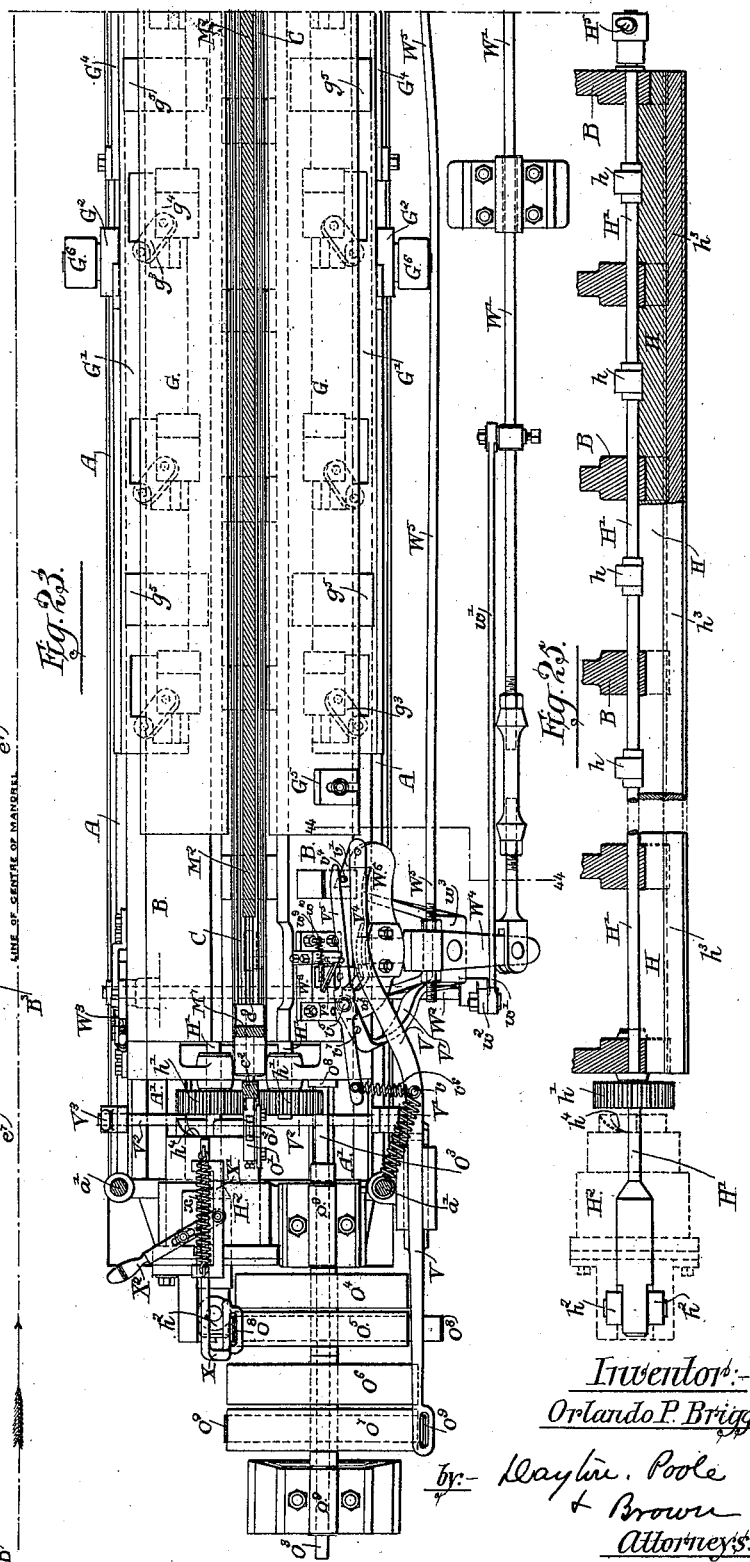

In the accompanying drawings, illustrating my invention, Figures $1^a$, $1^b$, $1^c$, and $1^d$ show a machine embodying my invention in side view. Figs. $2^a$, $2^b$, $2^c$, and $2^d$ show the said machine in central vertical longitudinal section. Fig. 3 is an end view of the machine, as seen from the rear. Fig. 4 is a vertical transverse section of the machine, taken upon line 4 4 of Fig. 1. Fig. 5 is a transverse sectional view taken upon line 5 5 of Fig. $1^b$. Fig. 6 is a similar section taken upon line 6 6 of Fig. $1^b$. Fig. 7 is a sectional view taken upon line 7 7 of Fig. $1^c$. Fig. 8 is a similar section taken upon line 8 8 of Fig. $1^c$. Fig. 9 is an enlarged detail elevation of the seam-forming and corrugating devices shown in Fig. 8. Fig. 10 is a sectional view of the part illustrated in elevation in Fig. 8, taken upon the section-line 10 10 of Fig. $2^c$. Fig. 11 is a cross-sectional view taken upon the line 11 11 of Fig. $1^d$. Fig. 12 is an enlarged fragmentary sectional elevation of parts adjacent to the forward end of the forming-mandrel. Fig. 13 is a sectional end elevation of parts shown in Fig. 12, the section being taken upon line 13 13 of said Fig. 12. Fig. 14 is a side view of devices for supplying oil to the seam-folders. Fig. 15 is a sectional elevation of the same, taken upon line 15 15 of Fig. 14. Fig. 16 is a detail section taken upon line 16 16 of Fig. $1^a$. Fig. 17 is a sectional view taken upon line 17 17 of Fig. $1^a$. Fig. 18 is a sectional view taken upon line 18 18 of Fig. $1^a$. Fig. 19 is a detail section taken upon line 19 19 of Fig. $1^a$. Fig. 20 is a detail section taken upon line 20 20 of Fig. $2^a$. Fig. 21 is a detail section taken upon line 21 21 of Fig. $2^b$. Fig. 22 is a detail side view of the seam-folding devices, showing the side thereof opposite to that seen in Fig. $2^b$. Fig. 23 is a sectional plan view of the parts shown in Figs. $1^a$ and $2^a$, taken upon the horizontal section-line 23 23 of Fig. $1^a$. Fig. 24 is a detail sectional view taken upon the horizontal section-line 24 24 of Fig. 7. Fig. 25 is a detail sectional view taken upon section-line 25 25 of Fig. 5. Fig. 26 is an enlarged detail side elevation with parts in section of the seam-folding devices. Fig. 27 is an underneath plan view of the same. Fig. 28 is a section taken upon line 28 28 of Fig. 26. Fig. 29 is a section taken upon line 29 29 of Fig. 26. Fig. 30 is a cross-section taken upon line 30 30 of Fig. 26. Fig. 31 is a cross-section taken upon line 31 31 of Fig. 26. Fig. 32 is a cross-section taken upon line 32 32 of Fig. 26. Fig. 33 is a cross-section taken upon line 33 33 of Fig. 26. Fig. 34 is a cross-section taken upon line 34 34 of Fig. 26. Fig. 35 is a cross-section taken upon line 35 35 of Fig. 26. Figs. 36, 37, 38, 39, 40, and 41 are detail perspective views of certain of the folding-dies shown in Figs. 26 to 35. Figs. 42 and 43 are sectional views illustrating the process of forming the seam. Fig. 44 is an enlarged detail section taken upon the line 44 44 of Fig. 23. Fig. 45 is an elevation of the parts shown in Fig. 44, as seen when looking in the direction of the arrows upon line 45 45 of said Fig. 44. Fig. 46 is a detail plan section of the parts illustrated in Figs. 44 and 45, as viewed when looking in the direction of the arrows upon line 46 46 of said Fig. 45. Fig. 47 is a detail plan view showing a changed position of the parts shown in Fig. 46. Fig.

48 is a detail section taken upon line 48 48 of Fig. 22. Fig. 49 is a detail plan section taken upon line 49 49 of Figs. 1$^c$ and 1$^d$.

In the machine illustrated in the drawings, A indicates the main frame or bed thereof, which consists, principally, of two heavy plates or girders arranged parallel with each other and connected by suitable cross-ties or girts.

B indicates a traveling bed or carriage sustained upon the frame A and sliding in longitudinal grooves or ways A' A' upon said frame.

C is a mandrel about which the sheet metal is clamped, and which aids in giving shape to the pipes or tubes formed by the machine. Said mandrel is sustained upon the carriage B and is movable longitudinally thereof.

D is a vertically-movable clamp-bar located beneath the mandrel and movable longitudinally with the latter. Said clamp-bar D operates to grip or clamp the metal sheet against the mandrel at the beginning of the operation of forming the pipes or tubes in the machine.

E E' E$^2$ are a series of clamp-bars movable in radial planes obliquely toward and from the mandrel. Said clamp-bars are arranged at opposite sides of the mandrel and are mounted in supports or arms B', rigidly attached to or forming part of the carriage B.

F F' F$^2$ are a series of gibs held in frames or castings A$^2$ A$^2$, and constructed to actuate the clamp-bars for thrusting the latter inwardly toward the mandrel, as hereinafter described. Said gibs are herein shown as held between guide-surfaces $a$ $a$, formed in the castings A$^2$, which latter have the form of heavy and strong upwardly-extending arms attached to the bed A at opposite sides of the path of the carriage.

G G, Figs. 1$^a$, 4, and 23, are vertically-movable benders or folders located upon the carriage at either side of the mandrel for bending upwardly about the mandrel a flat sheet of metal or blank from which the tube is to be formed. Said folders operate to bend the blank into U shape, so that the latter may be carried with the mandrel by an endwise motion of the latter between the clamp-bars E E' E$^2$ preparatory to the action of the latter thereon.

H H are clamp-bars mounted in the carriage B at either side of the clamp-bar D and between the latter clamp-bar and the clamp-bars E E' E$^2$. Said bars H H are for the purpose of forcing into contact with the mandrel those parts of the sheet-metal blank between the said clamp-bar D and the side clamp-bars E E' E$^2$.

I I are stationary wipers sustained upon the frame-arms A$^2$ A$^2$, and constructed to press or force the blank against that portion of the mandrel above the clamp-bars E$^2$ E$^2$ in such manner as to bring the marginal parts of said blank together over the mandrel as the latter, together with the blank, is moved forward past said wipers at a time when the blank is held against the mandrel by the clamp-bars E E' E$^2$, which travel endwise with the mandrel, in a manner hereinafter explained.

J indicates as a whole the seam-folding device, which is located between the upper ends of the castings A$^2$ A$^2$ and between the wipers I I.

K is a guide-plate located between the wipers I for bending outwardly the meeting edges of the blank before the said edges enter the seam-folders.

L is a spring detent or stripper located at the forward ends of the frame-arms A$^2$ A$^2$, and constructed to engage the rear edge of the finished tube and strip it from the mandrel as the latter moves backward after the release of the clamp-bars therefrom.

The carriage B is somewhat longer than twice the length of the mandrel C, and the said mandrel is movable longitudinally upon the carriage through a path of somewhat greater length than the said mandrel. The clamp-bar supports or arms B' B' are located at the forward end of the carriage, (referring to its direction of motion while the tube is being formed,) and the said clamp-bars E E' E$^2$ and the supports B' B' are approximately the same length as the mandrel, these parts being so arranged that the mandrel may be moved back upon the carriage until free from said supports to enable the flat blanks to be inserted beneath the mandrel at the rear of said supports B' B', and to be clamped or secured thereto by the action of the lower clamp-bar D.

The castings A$^2$ A$^2$, by means of which the gibs F F' F$^2$ are supported, are located at that part of the machine-frame toward which the carriage moves in forming the tube, and in such position that when the carriage is at the rearward limit of its movement the clamp-bar supports B' will be free from said castings A$^2$. The said clamp-bar supports are adapted in the forward movement of the carriage to freely pass between said castings A$^2$ A$^2$. The guides A' of the bed A are extended forward of the frame arms or castings A$^2$ a sufficient distance to enable the carriage B to be advanced so as to carry the mandrel entirely past the said frame arms or castings A$^2$ A$^2$.

The wipers I I are supported upon plates or brackets I' I', which are secured in an oblique position upon the upper ends of the castings A$^2$ A$^2$, as more clearly shown in Figs. 2$^c$, 8, 9, and 48. Said wipers are located upon the castings A$^2$ A$^2$ in position to operate upon the blank in the forward movement of the mandrel beneath them, the said wipers for this purpose being located near the rear ends of said castings A$^2$. Longitudinally-arranged V-shaped castings A$^3$ A$^3$ are herein shown as bolted to the upper surfaces of the frame-arms A$^2$ A$^2$ for supporting the wipers I I at the desired inclination.

The seam-forming device J is mounted upon a vertically-arranged plate or casting J', which is sustained by means of a casting or bracket K² from one of the said plates or brackets I', by which the wipers are supported. Said seam-forming devices are mounted between the forward ends of the wipers I and near the forward end of the castings A² A². The supports B' B' upon the carriage extend upwardly at the sides of the mandrel only, with sufficient space between their upper ends to enable them to freely pass the wipers I I and the seam-folders above described.

The mandrel C is connected with and sustained upon the carriage B by means attached to the rear end of the mandrel only, in order to enable the finished tube to be drawn freely from the mandrel over the forward unsupported end of the latter. In order to prevent the free end of the mandrel sustained in this manner from being lifted or thrust upwardly out of place when the clamp-bar D is carried upwardly against it, an upper horizontally-arranged abutment plate or bar M is located over and rests upon the mandrel in such manner as to resist any upward movement of the latter during its longitudinal movement upon and with the carriage until said mandrel comes beneath and is held down by the clamp-bars E E' E² and by the wipers and seam-forming devices. Said plate or bar M is supported by a stationary longitudinal girder N, located over the path of the mandrel, as will hereinafter fully appear.

The operation of the several main parts of the machine above described is as follows: When the machine is at rest and in position for the insertion of the blank, the carriage B and the mandrel C are both at the rearward limit of their movement, and the mandrel is at the rear of and free from the arms B', by which the clamp-bars are sustained. The sheet-metal plate or blank is inserted beneath the mandrel with its side margins projecting equally, or nearly so, at either side of the center line of the mandrel. In forming the tube the lower clamp-bar D first rises and clamps the blank firmly against the mandrel. The folders G then rise and bend the blank about the mandrel in U form. The mandrel and the clamp-bar D, together with the abutment-bar M above the mandrel, then advance, so as to carry the blank outwardly from between the folders G G and between the arms B' B' and clamp-bars E E' E². The carriage then moves bodily forward with the mandrel and blank, and by this movement the clamp-bars E E' E² are thrown forward, so as to press the metal of the blank against the sides of the mandrel. The intermediate clamp-bars H are arranged to advance against the mandrel before the clamp-bars E E' E² engage the blank. After the several clamp-bars have advanced against the blank in the manner described, the abutment-bar M is released and remains stationary, while the carriage, mandrel, and blank continue their forward movement, and the blank is caused to encounter the wipers I I, whereby its upper part is forced inwardly and made to conform to the upper part of the surface of the mandrel, after which the meeting edges of the blank are engaged by the guide-plate K and seam-folding devices J, whereby the seam is made. The motion of the carriage and the mandrel carried thereby is continued until said mandrel has passed forward of and is free from the castings A², at which time the clamp-bars D H H E E' E² are retracted to release the blank. The carriage and mandrel are then moved backwardly to the rear end of the machine, the finished tube being stripped from the mandrel at the beginning of its backward movement by the engagement of the stripper L with its rear edge.

The details of construction present in the machine herein shown will now be more particularly described. The longitudinal girder N, by which the abutment-bar M is sustained over the mandrel, is attached at its forward end to heavy yoke-pieces $a^2$ $a^2$, attached to the rear ends of the castings A² A², and at its rear end is supported by a heavy cross-piece A⁴, connected by means of vertical posts $a'$ $a'$ with the bed A, Fig. 3. At points intermediate to its ends the said girder N is additionally sustained by being bolted to heavy arms A⁵ A⁵, secured at their lower ends to the sides of the bed A and outwardly curved in such manner as to allow the carriage B and parts supported thereby to pass freely between them, as clearly shown in Fig. 5. The girder N may be made in practice in any manner to give the necessary strength therein, but, as herein shown, is composed of two parallel vertically-arranged side plates $n$ $n$ and an intermediate heavy metal stringer $n'$, the plates $n$ and stringer $n'$ being secured together by bolts passing through them in the manner shown. The abutment-bar M is movable longitudinally with the mandrel until its front end has reached a point between the gibs F F' F², and said abutment-bar is at the same time made vertically movable to enable it to be engaged with and disengaged from the mandrel. Said abutment-bar is attached to and supported by a longitudinal slide-bar M', Figs. 2ª and 20, mounted upon the girder N in such manner as to bear upwardly against a horizontal bearing-surface of the said girder, the abutment-bar being engaged with inclined surfaces of the slide-bar, and so arranged that when the abutment-bar is moved longitudinally with relation to the said slide-bar M' the abutment-bar will be raised or lowered. In the particular construction illustrated the slide-bar M' is fitted to slide in a guideway formed between the lower margins of the plates $n$ $n$, which plates project below the lower surface of the stringer $n'$. The slide-bar is held in place within the groove or guideway by means of a longitudinal plate $n^2$, bolted to the lower edge of one of the plates $n$ and engaging a horizontal surface or shoulder of the slide-bar M', which latter is herein shown as made considerably narrower in its lower than in its upper part. Said slide-bar M' bears upwardly against the horizontal lower surface of the stringer $n'$ under the upward pressure produced by the thrust of the lower clamp-bar D against the mandrel, and in order to reduce the frictional resistance to the longitudinal movement of the said carriage with the mandrel the slide-bar is provided with a series of anti-friction rollers $m$ $m$, which bear against the lower surface of the stringer $n'$. The inclined surfaces for engagement with the abutment-bar M are preferably formed upon the lower edge of the slide-bar M', as indicated at $m'$ $m'$ $m'$, while the upper surface of the abutment-bar is provided with a series of correspondingly-inclined surfaces $m^2$ $m^2$ $m^2$, interfitting therewith. For sustaining the said abutment-bar M in contact with the slide-bar M'. The latter is herein shown as provided with side plates $m^3$ $m^3$, Figs. 1$^a$ and 20, which plates extend downwardly below the lower edge of the slide-bar M', and are provided with oblique slots $m^4$ $m^4$, which are engaged by pins $m^5$ in the abutment-bar M. The slots $m^4$ $m^4$ are parallel with the inclined surfaces $m'$ $m^2$ of the slide-bar and abutment-bar, so that the contact-surfaces of the bars will remain in engagement when the abutment-bar is lifted by the action of the said slots and pins in the endwise movement of the abutment-bar.

The abutment-bar M is herein shown as provided with a separate bar M$^2$, forming its working-face, the separate bar M$^2$ being adjacent to the mandrel and having its working-surface fitted to said mandrel. The bar M$^2$ is made removable in order that wider or narrower bars may be substituted therefor to correspond with the sizes of the different mandrels used in the machine.

The abutment-bar M is actuated to engage it with and free it from the mandrel by devices which in the machine illustrated are actuated by engagement with the mandrel itself in the longitudinal movement of the latter, as will be fully explained after the particular means herein employed for moving the mandrel and their operation shall have been set forth.

The mandrel is supported from the carriage B by means of a longitudinally-movable sliding support O, Figs. 1$^a$ and 2$^a$, which is mounted in suitable guides in said carriage below the mandrel, as seen in Figs. 2$^a$, 2$^b$, 4, 5, 6, and 7. Said support O is provided at its rear end with a rigid standard O', having sliding connection in its upper end with the mandrel. The clamp-bar D is sustained upon the mandrel-support O, said clamp-bar and support being provided upon their adjacent faces with a series of interfitting inclined faces $d$ $o$, so arranged that when the support is moved longitudinally with reference to the clamp-bar D the latter will be lifted into contact with the mandrel. The clamp-bar is connected with the mandrel by means permitting a vertical but not longitudinal movement of said clamp-bar with reference to the mandrel. The means herein shown for this purpose consist of a short link $d'$, pivoted to the rear end of the said clamp-bar and to a vertical bar or standard D', which passes vertically through and is rigidly fixed in the mandrel and rests at its lower end upon the upper surface of the support O at the rear of the clamp-bar. Said bar D', together with the standard O', serves to maintain the mandrel in a horizontal position. Sliding connection between the standard O' and the mandrel is formed by means of a T-head $o'$ upon the standard O', engaging a correspondingly-shaped longitudinal recess C' in the mandrel, as clearly shown in Fig. 2$^a$. As far as above described, the parts for sustaining the mandrel are made in the same manner as the corresponding parts illustrated in the said prior application hereinbefore referred to.

As an improvement in the mandrel-sustaining devices, I have herein shown a wedge D$^2$ as interposed between the lower end of the standard D' and the opposing upper surface of the mandrel-support O. Said wedge D$^2$ is connected with the lower part of the standard by means of a set-screw $d^2$, passing horizontally through said parts in such manner that by turning the screw the wedge may be moved forward and backward relatively to the said standard. The purpose of the said wedge D$^2$ is to raise and lower the standard D' as necessary in inserting mandrels of different sizes in the machine, and for accurately adjusting the mandrel to a horizontal position in inserting it. The wedge D$^2$ is herein shown as forming the lower bearing-surface of the standard D' in contact with the mandrel-support O, and said wedge slides in a suitable longitudinal guide upon said support as the latter is moved. The mandrel is moved longitudinally upon the carriage by suitable actuating devices applied to the sliding support O, and the purpose of the sliding connection between the mandrel and the said support O is to enable the latter to be moved forward a sufficient distance to actuate the clamp-bar D before the mandrel is caused to partake of the forward movement of said support.

For holding the mandrel from forward movement with the support O until the clamp-bar has been forced upwardly into contact with the mandrel, a detent C$^2$ is provided, which is arranged to engage the rear end of the sliding bar M', and said sliding bar is provided at its forward end with a second detent C$^3$, engaging the advance end of the mandrel. By this construction the mandrel is held from movement with the mandrel-support at the beginning of the motion of the latter through the medium of the said sliding bar M', the detent C$^2$ being disengaged from the said sliding bar, so as to allow the latter to advance with the mandrel at the time said mandrel begins its forward movement. The recess C' is made considerably longer than the standard O' engaged therewith, and said standard is adapted to slide freely within the said recess, so that the mandrel-support may be carried forward a distance sufficient to lift the clamp-bar into contact with the mandrel before the mandrel is carried forward with the support.

In the particular construction illustrated the detent $C^2$ consists of a horizontal bar pivoted at $c$ at a point adjacent to the rear end of and beneath the girder N, and extending forward beneath the said girder to a point over the rear end of the mandrel. The detent is provided at its forward free end with a depending hook or projection $c'$, adapted to engage a notch $m^6$, formed in a rearwardly-extending part or arm $M^3$ of the sliding bar M'. Attached to the said detent $C^2$ is a depending arm $c^2$, which extends downwardly to a point at the rear of the mandrel and adjacent to the top surface of a rearwardly-extending horizontal arm $O^2$ of the standard O'. The detent is normally held with the hook $c'$ in position to engage the notch $m^6$ by means of a spiral spring $C^5$, applied between the rear end of the detent and a stationary arm projection $C^6$ upon the machine-frame. The pivot $c$ of the detent $C^2$ is preferably made vertically adjustable by being mounted in a vertically-sliding frame $C^7$, which is sustained at a desired elevation by means of a set-screw $C^8$, passing vertically through the upper part of the frame and bearing at its lower end against an opposing part of the machine-frame. The downward movement of the detent $C^2$ is limited by means of an arm or stop $C^9$, Figs. 1$^a$, 2$^a$, and 3, herein shown as attached to the girder N.

The arm $O^2$ of the standard O' is provided near its rear end with a projection $o^2$, having an inclined or cam-shaped forward edge or face adapted to engage the lower end of the arm $c^2$, and thereby lift the detent $C^2$ when the standard O' is moved forward a short distance from its rearward position. As herein shown, the detent $C^2$ is provided with a longitudinal slot $c^3$, while the arm $c^2$ is provided with a vertical slot $c^4$, and the said detent and arm are connected by a bolt $c^5$, passing through slots in said parts, thereby enabling the arm to be adjusted longitudinally upon the detent and the lower end of said arm to be adjusted vertically, as necessary or desirable in operating with mandrels of different sizes, the pivot $c$ of the mandrel being made vertically adjustable for the same purpose, as hereinbefore described. The inclined stop $o^2$ is so arranged with reference to the lower end of the arm $c^2$ that the detent will be raised to release the slide-bar M' and the mandrel soon after the mandrel-support O has been moved forward sufficiently to elevate the lower clamp-bar D into contact with the mandrel. This movement of the mandrel-support may be accomplished either by a bodily forward movement of the carriage B or by moving the mandrel-support forward upon the carriage, as will be hereinafter more fully explained. The abutment-bar M above the mandrel and the slide-bar M', carrying said abutment-bar, are, as before described, moved forward with the mandrel until the latter has advanced between the clamp-bars E E' $E^2$ and has been gripped by the latter.

The detent $C^3$, which is mounted at the forward end of the slide-bar M' and engages the forward end of the mandrel, as above described, is, as herein shown, constructed to slide vertically upon the said slide-bar M', and is actuated automatically by devices which lift it free of the mandrel when the forward end of the slide-bar reaches a point somewhat in advance of the rear ends of the castings $A^2$. The said detent $C^3$ is, as herein shown, attached to the lower end of a vertical slide-bar $C^4$, mounted to slide in guideways $M^4$ $M^4$ near the forward end of the slide-bar M'. The bar $C^4$ is extended to the upper surface of the slide-bar M', and is of such length that its upper end is in alignment with the top surface of said bar M' at the time the detent $C^3$ is engaged with the mandrel. When the detent is lifted and free from the mandrel, the said bar $C^4$ extends above the level of the slide-bar M'. The stringer $n'$, beneath which the slide-bar M' is located and against which it bears upwardly, is extended to a point somewhat in advance of the rear end of the castings $A^2$, and the upper end of the vertical slide-bar $C^4$ rests beneath the said stringer, and is held downwardly thereby during the time the mandrel and the said slide-bar M' are advancing between the clamp-bars E E' $E^2$ and until the carriage B, carrying the clamp-bars, has moved forward with the mandrel a sufficient distance to free the said bar $C^4$ from the stringer $n'$. As soon as the said bar $C^4$ has passed forward beyond and is free from the stringer $n'$ the bar $C^4$ and the detent $C^3$ are lifted by the action of an oblique or inclined surface $c^6$ upon the vertical slide-bar $C^4$, which inclined surface engages a stationary roller $M^5$, Figs. 7 and 22, mounted upon one of the castings $A^3$ $A^3$ slightly in advance of the forward end of the stringer. In the particular construction shown the vertical slide-bar $C^4$ is slotted and embraces the end of the slide-bar M', as clearly shown in Figs. 6, 12, and 13.

Devices are provided for moving the abutment-bar M longitudinally to free it from the mandrel at the same time the detent $C^3$ is lifted clear of the mandrel, such devices being made as follows: $M^6$ is a plate rigidly attached to the side of the vertical slide-bar $C^4$ and extending rearwardly beyond said sliding bar in position to overlap the adjacent end of the abutment-bar M. The abutment-bar is provided with an oblique slot $m^7$, which slot is engaged by a pin $m^8$, affixed in the plate $M^6$. The slot $m^7$ and pin $m^8$ are so arranged that when the plate $M^6$ is lifted the abutment-bar will be thrust rearwardly, and thereby freed from the mandrel, and when said plate is depressed the abutment-bar will be drawn forward and clamped firmly against the mandrel. The said plate $M^6$ being attached to and moving with the sliding bar $C^4$, when said bar is actuated by the roller $M^5$ in the manner described the said plate $M^6$ will be lifted and the abutment-bar M thrust backwardly and freed from the mandrel.

In order to allow vertical adjustment of the plate $M^6$, as may be necessary in adjusting the parts for operation, and in placing mandrels of different sizes in the machine, said plate is herein shown as held or guided by a vertical rib $c^7$ upon the side of the sliding bar $C^4$, and as secured to the said bar $C^4$ by means of bolts $m^9 m^9$, passing through vertical slots $c^8 c^8$ in the bar $C^4$. Said bolts $m^9 m^9$ also pass through vertical slots in the slide-bar $M'$, as clearly shown in Figs. $2^b$ and 6.

From the construction above described it is entirely obvious that when the inclined surface $c^6$ of the vertical slide-bar $C^4$ strikes the roller $M^5$ both the detent $C^3$ and plate $M^6$ will be lifted, thereby releasing said detent and the supporting-bar $M'$ from the mandrel and allowing the mandrel to advance without the slide-bar $M'$ and abutment-bar M, which latter parts remain stationary in the continued forward movement of the mandrel until the latter has reached the forward limit of its movement and returns to a point beneath the abutment-bar. The said slide-bar and abutment-bar are moved or carried rearwardly with the mandrel by means of a depending arm $M^7$ upon the rear end of the slide-bar $M'$, which arm $M^7$ is adapted to engage a shoulder $c^9$, formed upon the mandrel near the rear end of the latter. Said arm $M^7$ is arranged to engage the shoulder $c^9$ in the backward movement of the mandrel as soon as the mandrel reaches a position beneath the abutment-bar M, and in the further backward movement of the mandrel the slide-bar and supporting-bar are carried backward with it. The rearward movement of the mandrel is positively arrested by means of a stationary stop or arm $C^{10}$, Figs. $1^a$, $2^a$, 3, and 17, herein shown as attached to the girder N and arranged to engage the rear end surface of the mandrel.

The re-engagement of the detent $C^3$ with the front end of the mandrel and the downward movement of the abutment-bar M into contact with said mandrel are for convenience arranged to occur soon after the rearward movement of the slide-bar $M'$ with the mandrel begins to take place. The actuation of the said detent $C^3$ and the abutment-bar is accomplished at this time by means of an inclined surface $N'$ at the forward end of the stringer $n'$. Said inclined surface is constructed to engage the upper end of the sliding bar $C^4$, and to thereby depress said sliding bar, with the effect of engaging the detent $C^3$ and the abutment-bar M with the mandrel, in the manner hereinbefore described. The detent $C^3$, inasmuch as it is lifted to free it from the mandrel by being thrust against the roller $M^5$ by its contact with the mandrel itself, is moved upwardly by the action of said roller a distance sufficient only to allow the mandrel to pass beneath it. In the return or rearward movement of the mandrel, therefore, the latter is liable to pass in close proximity to the under surface of the said detent, so that the mandrel is sometimes liable to come in frictional contact with the detent to an extent sufficient to drag the said detent, together with the slide-bar $M'$, backwardly, and thereby release the slide-bar $C^4$ from the said roller. Such release of said slide-bar $C^4$ would of course allow the detent to rest with its full weight upon the mandrel, and would thereby cause the said slide-bar $C^4$ and abutment-bar to be carried still farther rearward with the mandrel, and in such rearward movement of the parts the upper end of the slide-bar would be carried against the cam-surface $N'$, with the result of forcing or jamming the said detent $C^3$ and the abutment-bar $M^2$ against the top of the mandrel. The frictional engagement of the mandrel with the detent $C'$, in the manner and with the objectionable results described, is commonly only liable to occur when the parts of the machine have become worn by use so as to work very freely. In order, however, to avoid possibility of the detent being carried backwardly in the manner described, I have provided a frictional retarding device, consisting, as herein shown, Figs. $2^b$, $2^c$, and 22, of a spring-arm $N^2$, attached to the girder N and having its free end located adjacent to the rear edge of the bar $C^4$ at the time the latter is engaged with the roller $M^5$, the end or surface of the said spring-arm engaged with the said bar being provided with an inclined surface $n^3$ at its forward end for engagement with said slide-bar $C^4$, as clearly shown in Fig. 22, wherein the mandrel, the slide-bar $N'$, and the slide-bar $C^4$ are shown in dotted lines. The spring-arm is shown as held in position to engage the said bar $C^4$ by means of a spring $N^3$, placed between said spring-arm and a nut or head upon a vertical rod $N^4$, which is secured in the girder N. When the upper end of the bar $C^4$ strikes the spring-arm $N^2$ in the forward movement of the said bar said spring-arm will be lifted to allow the passage beneath it of the said slide-bar $C^4$. When the mandrel and slide-bar have stopped by the contact of the roller $M^5$ with the said slide-bar $C^4$, the upper end of the slide-bar will engage the inclined surface $n^3$, and said slide-bar $C^4$ will be held from rearward movement unless the slide-bar $M^2$ is carried backwardly by the positive engagement of the mandrel. By this construction any rearward movement of the said slide-bar $C^4$ will be prevented until the front end of the mandrel has passed to the rear of the said slide-bar $C^4$ and the detent attached thereto, when the contact of the mandrel with the arm $N^7$ of the slide-bar M' will cause the several parts to move rearwardly with the mandrel, in the manner hereinbefore described.

As a preferred means for actuating the sliding mandrel-support O, said support is provided upon its lower surface with spur-teeth $o^3$, which are engaged by a pinion $o^4$, affixed to a transverse shaft $o^5$, which is mounted in suitable bearings in the carriage B, Figs. $2^b$ and 6. Said shaft $o^5$ is provided with a beveled gear $o^6$, engaging a beveled pinion $o^7$, mounted upon a shaft $O^3$, arranged longitudinally of the machine-frame and having bearings $o^8$ in the said carriage, Fig. 5, and other bearings $o^9$ $o^9$ upon the bed A at the rear end of the machine, Figs. 3, 23, and $1^a$. Said shaft is provided with fast and loose pulleys $O^4$ $O^5$ $O^6$ $O^7$, whereby rotary motion is transmitted thereto by means of driving-belts $O^8$ $O^9$. In order that motion may be transmitted from the shaft $O^3$ to the shaft $o^5$ in all positions of the carriage upon the bed, the shaft $O^3$ is extended nearly the entire length of the bed, and the bearings $o^8$ of the carriage are constructed to slide longitudinally upon the shaft, the beveled pinion $o^7$ being provided with a spline engaging a longitudinal groove in the shaft, whereby said wheel may slide longitudinally on the shaft during the movement of the carriage.

The devices above described for actuating the mandrel-support are substantially like those shown in said prior application.

As hereinbefore stated, the lifting of the lower clamp-bar D against the mandrel is accomplished by the forward motion of the mandrel-support O relatively to the mandrel and the clamp-bar. In the machine shown in said prior application hereinbefore referred to, as well as in the present machine, the mandrel is held from movement while the mandrel-support is being advanced to lift the lower clamp-bar D and form the first corrugate by means of the latch or detent $C^2$. It has been found, however, somewhat difficult to so adjust the parts that the lower clamp-bar D shall come into forcible bearing against the mandrel at the exact instant that the mandrel is released, it being obvious that the release of the mandrel may take place slightly before the lower corrugate is fully formed. It has been found, furthermore, that in a machine thus constructed, when the mandrel reaches the forward limit of its movement its impetus is likely to carry or move it forward to a slight extent upon the mandrel-support, and thus loosen up or free the lower clamp-bar before the side clamp-bars have advanced to bend the blank against the mandrel, thereby producing an imperfect lower corrugate and at the same time stretching the lower corrugate so as to give too much metal at the margins of the blank to properly form the seam. To avoid these difficulties, I have provided a stop upon the carriage, arranged to engage the mandrel when the latter reaches the forward limit of its movement, said stop being constructed to strike the mandrel and arrest its movement while the mandrel-support is still in motion, so that the forward motion of said mandrel-support will continue until the lower clamp-bar has been thrust into forcible contact with the mandrel. Any rearward movement of the mandrel-support being prevented by the gearing connected therewith, the lower clamp-bar D will, by this construction, be held firmly and rigidly in position until the side clamp-bars have advanced and the side portions of the blank have been firmly clamped against the mandrel. In the particular construction of the stop for the mandrel herein illustrated said stop consists of a plate or arm $C^{11}$, Fig. $1^b$, which is bolted to the carriage and extends inwardly toward the mandrel, said plate $C^{11}$ being located in the path of and constructed to engage a pin $C^{12}$, secured in the mandrel near the rear end of the latter, as clearly shown in Fig. $1^a$. The clamp-bar D is released from the finished tube by moving the mandrel support O rearwardly a short distance after the clamp-bars E E' $E^2$ have gripped the blank and before said clamp-bars are released from the mandrel. Such rearward movement of the mandrel-support is produced by a reverse motion of the shaft $O^3$, accomplished by belt-shifting devices controlled by the operator, as will hereinafter appear.

The devices herein illustrated for folding or bending the side portions of the blank upwardly around the mandrel after the said blank has been clamped against the mandrel by the action of the clamp-bar D embrace features of novelty, and are constructed as follows: The folders G G are mounted upon the carriage B at either side of the mandrel and are movable vertically upon the carriage in the act of folding the blank. The said folders consist of horizontally-arranged plates, which rest normally somewhat below the bottom of the mandrel, in order that the blank may be inserted beneath the mandrel and over the plates, and said folders are moved or lifted vertically upward to a point near or somewhat above the middle of the mandrel for the purpose of bending the marginal parts of the blank upwardly about the mandrel, thereby bringing the blank into a ∪ shape. The said folders G G are more clearly shown in Figs. $1^a$, $1^b$, 4, 19, and 23. The horizontal plates G G, composing the folders proper, are mounted upon longitudinally-arranged supporting-bars G' G', with which they are connected in such manner as to enable the plates to be adjusted vertically with reference to the bars, as will hereinafter appear. The said bars G' G' are connected with the carriage by a plurality of connecting bars or links $g$ $g$, pivoted to the bars G' and to lugs $g'$ upon the carriage, said links being pivoted in such manner as to swing in vertical planes parallel to the central axis of the machine. The pivoted links $g$ $g$ obviously allow the folders and folder-supporting bars to be raised and lowered, while said parts are held from lateral movement by the said links, and also by the engagement of the lugs $g'$ $g'$, with guide-apertures $g^2$, formed in the bars G', as clearly shown in Fig. 19. The folders G and folder-supporting bars G' are lifted to accomplish the folding of the blank by means of stationary rollers $G^2$ $G^2$, Fig. 1$^a$, arranged to engage inclined surfaces $G^3$ upon the bars G' in the advance movement of the carriage, the parts being so arranged that the carriage and mandrel may move a sufficient distance forward to actuate the folders before the mandrel is moved forward upon the carriage to carry the blank between the clamp-bars E E' $E^2$. In the particular construction illustrated said rollers $G^2$ are mounted upon heavy arms $G^6$, bolted to the sides of the bed A in the manner indicated in Fig. 4.

Inasmuch as the folders move forward with the carriage throughout the full extent of the movement of the latter, it is desirable to retain said folders in their elevated position during the forward and backward movement of the carriage. For the purpose of sustaining the said folders, therefore, I provide stationary horizontal guide-bars $G^4$ $G^4$, the upper surfaces of which guide-bars are arranged in the same horizontal plane with the tops of the rollers $G^2$. Said guide-bars $G^4$ extend forwardly from the rollers $G^2$ past the supporting-arms $A^5$ $A^5$ of the frame, inside of the latter, and are attached at their forward ends to the rear ends of the frame-castings $A^2$, which sustain the gibs F F' $F^2$. It will of course be understood that the front ends of the folders move forward inside of said castings $A^2$; but the rear ends of the folders do not pass the rear ends of the castings, and are therefore sustained by said guides when the carriage is at the forward limit of its movement.

The adjustable connection between the folders G G and the folder-supporting bars G' G' is formed by means of links $g^3$ $g^3$, pivoted to the said bars, and to lugs $g^4$ $g^4$ on the under surfaces of the folders, and arranged to swing in oblique planes inclined upwardly and inwardly, so that as the folders are lifted they are swung inwardly toward the mandrel. By this construction the inner edges of the folders may be placed in proper position with relation to a large or small mandrel by lifting the said folders G a sufficient distance away from the bars G', the oblique pivoted links $g^3$ being so arranged as to carry the folders inwardly to the extent necessary for this purpose.

Any suitable means may be employed to support the folders at the proper elevation, the device for that purpose herein shown consisting merely of rectangular blocks $g^5$, placed upon the bars G' beneath the folders, thicker or thinner blocks being inserted according to the size of the mandrel employed.

In the operation of the machine the carriage is moved forward for actuating the folding devices after the lower clamp-bar D has been lifted to clamp the blank to the mandrel and before the said mandrel begins its advance movement upon the carriage for carrying the blank between the clamp-bars E E' $E^2$, in the manner before described. In this advance movement of the mandrel the blank, being held upon the mandrel by the clamp-bar D, will obviously move with the mandrel, and will be carried thereby out of engagement with the inner edges of the folders G G and into the space between the arms B' in position for the action of the clamp-bars E E' $E^2$ thereon.

The clamp-bars H and means for actuating them (herein shown) are substantially like the corresponding parts shown in the said prior application. Said clamp-bars are held and adapted to slide between guide-faces $b'$ $b'$ of the carriage B, Figs. 4, 5, 6, and 7, and are located in the forward part of said carriage beneath the clamp-bars E. For actuating the said clamp-bars H H, two longitudinally-arranged shafts H' H' are mounted in the carriage B below and radially in line with said clamp-bars, each of said shafts being provided with a series of eccentrics $h$, Figs. $2^b$, 5, and 25, engaging the lower edges of the clamp-bars in such manner as when the shaft is given a half-rotation in one direction the clamp-bars will be advanced to engage the mandrel, and when turned to an equal extent in the opposite direction the clamp-bars will be released and allowed to fall away from the said mandrel. The shafts H' H' are provided at the rear end of the carriage with intermeshing gear-wheels $h'$ $h'$, Figs. 1$^a$ and 23, and one of said shafts is extended rearwardly beyond the carriage, and is provided upon its rear end with two radial roller-pins $h^2$, Fig. 25, engaging cam-grooves $h^3$, formed in a stationary casting $H^2$, said grooves $h^3$ being adapted to move the roller-pins $h^2$, so as to give a partial rotation to the shaft H as the said pins are carried through the grooves in the forward movement of the shaft and carriage, and thereby cause the clamp-bars H to be forced toward the mandrel. The grooves $h^3$ are made straight and parallel with the shaft H' in their rear portions, so as to enable the pins $h^2$ to travel through them without turning the shaft while the carriage is being advanced to cause the operation of the folders G, and said grooves are made of curved or spiral form in their parts adjacent to the front end of the casting, so as to advance the clamp-bars to the mandrel at the beginning of the forward movement of the latter upon the carriage. In the continued forward movement of the carriage after the shafts have been actuated, as above set forth, the pins $h^2$ are carried out of the cam-grooves $h^3$ and remain free from the same until re-engaged therewith in the backward movement of the carriage.

In order to give a backward turn to the eccentric-shaft H', so as to release the clamps H at the forward limit of the movement of the carriage, and thereby enable the mandrel to be withdrawn from the finished tube, one of the said shafts is extended beyond the forward end of the carriage B, and is provided with a radial arm $H^5$, constructed to engage a stationary cam-plate $H^6$, Figs. $1^d$, $2^d$, and 11, located at the forward end of the machine, and arranged to give a partial backward rotation to the shaft when encountered by the said arm $H^5$. An arm or prong $H^7$, Figs. $2^c$ and 11, is shown in the drawings as employed to engage the arm $H^5$, so as to prevent the shaft being turned too far by the action of the cam $H^6$.

The means herein shown for moving the carriage B longitudinally upon the frame A consists of a heavy rack-bar $B^2$, secured to the lower surface of the carriage between the guides A' of the frame, said rack-bar being engaged by a spur-wheel P, mounted upon a shaft P', having bearings in the sides of the frame. Said shaft P' is provided upon one of its ends outside of the frame with a worm-wheel $P^2$, engaging a worm $p$ upon a longitudinally-arranged shaft $P^3$. Adjacent to the shaft $P^3$ is another parallel shaft $P^4$, upon which is mounted a gear-wheel $P^2$, intermeshing with a pinion $p'$ upon the shaft $P^3$.

$P^5$ $P^6$ are two belt-pulleys mounted loosely upon the shaft $P^4$, and around which are passed driving-belts $P^7$ $P^8$, turning said pulleys in opposite directions.

$p^3$ $p^4$ are two clutch members attached to the pulleys $P^5$ $P^6$, and $p^5$ $p^6$ are two opposing clutch members attached to the ends of a sleeve $p^7$, which is mounted to slide longitudinally upon the shaft $P^4$ between the belt-pulleys $P^5$ $P^6$, and is connected with said shaft by a spline and groove, so as to turn with the shaft. By moving the sleeve $p^7$ either of the clutch members $p^5$ $p^6$ may be engaged with the corresponding clutch member $p^3$ or $p^4$ upon the belt-pulley $P^5$ $P^6$, thereby causing the shaft $P^4$ to be turned in either direction, according to the belt-pulley engaged therewith. Devices are provided for actuating the said sleeve $p^7$ from a point convenient to the operator at the front end of the machine, as will be hereinafter fully described.

The several clamp-bars E E' $E^2$, as more clearly shown in Figs. 5, 6, and 24, are made to slide between parallel guide-surfaces $b^2$, formed in the arms or castings B', and are held in place between said guide-faces by means of blocks or studs $b^3$, rigidly secured in the said casting and passing through inclined slots $e$ $e$ $e$ in the clamp-bars, the said slots being inclined in such manner that when the clamp-bars are thrust rearwardly they will also be carried inwardly into contact with the mandrel. The said clamp-bars, in the particular construction illustrated, are formed in two parts $e'$ $e^2$, Fig. 24, united by set-screws $e^3$, threaded upon their inner ends to engage correspondingly-threaded apertures in the inner parts $e^2$ of the clamp-bars and passing through the outer parts $e'$ of said bars, said set-screws being provided with collars at either side of the parts $e'$ to hold them from endwise movement therein, and having upon their outer ends heads adapted for engagement with a wrench, whereby said bolts may be rotated, and the distance between said parts thereby adjusted to give a greater or less pressure upon the blank, as desired.

In order to relieve the bolts $e^3$ of transverse strain when the clamp-bars are moved bodily by force applied to the forward ends thereof, the parts $e'$ and $e^2$ are provided with interlocking recesses and projections $e^4$ $e^5$, Fig. 24, having parallel side faces arranged transversely to the sides of the bars, so as to positively hold the said parts $e'$ and $e^2$ from relative longitudinal movement. The said parts $e'$ $e^2$ also are cut away at their adjacent edges between the bolts $e^3$, as clearly shown in Fig. 24, and in the spaces thus formed are located posts $b^6$, which serve to rigidly unite the wedge-shaped parts $B^3$, composing the arms B', and upon which the guide-surfaces $b^2$ are formed.

The clamp-bars, consisting of the connected parts $e'$ $e^2$, are moved rearwardly, so as to advance them into contact with the mandrel by means of cam-plates Q Q' $Q^2$, pivotally supported upon the carriage by means of pivots $q$, adjacent to the forward ends of said clamp-bars, in such manner as to swing in the same radial planes with the bars. As herein shown, the pivoted cam-plates Q are mounted in castings $B^4$, Figs. $1^b$, $2^b$, 7, 8, and 24, secured at the forward ends of the arms B' B' of the carriage. The said cam-plates Q Q' $Q^2$ are each provided with two flat surfaces $q'$ $q^2$, Fig. 24, the surface $q'$ being at a greater distance from the pivot $q$ than the surface $q^2$. When the clamp-bar is at the rearward limit of its movement, the end of the part $e'$ thereof rests in contact with the surface $q^2$ nearest the pivot, while the surface $q'$ faces outwardly and is approximately in alignment with the outer edge of the clamp-bar. By turning the several cam-plates Q Q' $Q^2$ so as to bring their surfaces $q'$ into contact with the clamp-bars the latter will obviously be forced backwardly a distance depending upon the relative distance between the surfaces $q'$ and $q^2$ and the pivotal axes of the cam-plates. In the operation of the machine the clamp-bars E E' $E^2$ are thrown backwardly, and thereby advance into contact with the mandrel by the action of the gibs F F' $F^2$ upon the outer parts of said cam-plates Q Q' $Q^2$, said cam-plates being so arranged that in the advance movement of the carriage they will encounter the ends of the gibs, and will be thereby turned about their pivots so as to force the clamp-bars backwardly and bring the flat surfaces $q'$ of the cam-plates into contact with the ends of the clamp-bars.

The parts $e'$ of the clamp-bars are, as clearly shown in the drawings, Figs. 5, 6, and 24, adapted to freely pass the gibs F F' $F^2$ without touching them. The said gibs F F' F² are connected with the castings A² by means of a series of short pivoted links $f$ $f$, Fig. 24, and a stop $f'$ is provided at the forward end of the gibs to limit their forward movement, the stop being so arranged that when the gibs are in contact with the stop the links will be inclined forwardly, thereby sustaining the gibs unyieldingly from outward or forward movement, but enabling the gibs to be moved outwardly if thrust bodily backward by pressure applied at their forward ends. The said gibs are held normally at the forward limit of their movement by springs $f^2$, suitably applied for the purpose, said springs, as herein shown, being placed about sliding rods $f^3$, provided with heads or arms $f^4$ at their inner ends, adapted to bear against one of the links, as clearly shown in Fig. 24.

The object of the construction described in the means for supporting the gibs is to enable the latter to yield outwardly to allow the movement past them of the clamp-bars E E' E² and cam-plates Q Q' Q² in the backward movement of the carriage after said clamp-bars have been advanced beyond the gibs to allow the release of the finished tube, it being entirely obvious that when the rear ends of said clamp-bars encounter the forward ends of the gibs in the rearward movement of the carriage said gibs will be thrust backwardly and outwardly for the purpose stated.

In order to enable the gibs to be moved inwardly and outwardly for adjusting them, as may be found necessary or desirable, the links $f$, instead of being pivoted directly to the castings A², are connected with bars F³, Fig. 24, held in the castings by bolts $f^4$, set-screws $f^5$ being inserted through the casting and arranged to bear against the bars F³, whereby the latter may be moved and held in their changed positions.

The machine shown is adapted for making pipe of different sizes or diameters by inserting therein mandrels of greater or less diameter, and by providing the clamp-bars at their inner edges with removable strips $d^3$ $h^3$ $e^7$, Figs. 5 and 6, varying in width to correspond with the sizes of the mandrels employed. When the machine is adapted for making corrugated pipe, and the mandrel is provided with corrugations or grooves corresponding in number and location with the clamps, as herein shown, the number of corrugations or grooves will obviously be the same, whatever the diameter of the pipe made.

When the clamp-bars E E' E² are thrust endwise by the contact of the cam-plates Q Q' Q² with the gibs F F' F², the outward strain caused by the pressure of the said clamp-bars upon the mandrel will obviously be transmitted to the arms B' through the studs $b^3$, this strain obviously tending to force said arms apart at their upper ends. In order to relieve this strain upon the arms and to hold all the parts rigidly to their work, the massive arms A⁵ (which, as before described, are bolted to the bed A and girder N) are provided upon their inner faces with adjustable gibs A⁶, Fig. 5, resting against the frame-arms B', both above and below the clamp-bars E', in the same manner as described in said prior application.

The rear ends of the gibs F F' F², which are engaged by cam-plates Q Q' Q² for moving the clamp-bars, are preferably located one in advance of the other, as clearly shown in Fig. 2ᵇ, so that said clamp-bars will be successively closed upon the mandrel in the forward movement of the carriage. When the machine is adapted for making corrugated pipe, the several clamp-bars H, E, E', and E² will be actuated in succession, beginning with the bar most remote from the free edge of the sheet, thereby enabling the metal of the blank to be forced into the grooves of the mandrel without stretching it.

The cam-plates Q Q' Q² are rotated or turned about their pivots, so as to allow the forward movement of the clamp-bars E E' E² for releasing the latter from the mandrel at the forward limit of the movement of the carriage by means of stationary horizontal stops Q³ Q⁴ Q⁵, arranged in such position as to strike inclined surfaces $q^3$ $q^3$ $q^3$, Fig. 24, of the said cam-plates Q Q' Q², and to thereby turn said plates through a quarter of a turn and bring their surfaces $q^2$ opposite the ends of the parts $e'$ of the clamp-bars. As herein shown, Figs. 1ᵈ, 2ᵈ, and 11, the stops Q³ Q⁴ Q⁵ are mounted upon an auxiliary frame consisting of standards R R, which are connected with the rear ends of the castings A² A² by means of two horizontal rods R' R² at each side of the machine, and are connected with each other by horizontal rods or girts R⁴ R⁵, to which are secured vertical castings R⁶ R⁶ for sustaining the several stops Q³ Q⁴ Q⁵. Said stops are movably held in the castings R⁶ R⁶, and are sustained in position by set-screws $r$, bearing against their rear ends, whereby the stops may be adjusted accurately in position upon the frame.

The cam-plate H⁶ and prong H⁷, for actuating the clamp-bars H, are herein shown as attached to and supported by the said castings R⁶ R⁶.

After the several cam-plates Q Q' Q² have been rotated by the action of the stops Q³ Q⁴ Q⁵ it becomes necessary to thrust the clamp-bars forward, so that they will slide obliquely outward upon the guide-pins $b^3$ $b^3$, Fig. 24, and thereby release the said clamp-bars from the mandrel. Devices for automatically thrusting the clamp-bars forward, for the purpose above stated, are herein provided, and more clearly shown in Figs. 1ᶜ, 1ᵈ, 2ᶜ, 2ᵈ, 8, 11, and 49. S S' S² in said figures indicate three pivoted dogs, which are mounted in frames or castings S³ S³, secured to the ends of the frame-castings A² A². Said dogs are arranged to swing in radial planes forming a continuation of the planes of the clamp-bars E E' E², and are pivoted at their outer ends, while their inner free ends are constructed to swing into the paths of the outer parts $e'$ of the clamp-bars. $S^4 S^4$ are two vertically-arranged castings located adjacent to the dogs $S S' S^2$ and constructed to slide longitudinally upon the frame-rods $R' R^2$. Said castings $S^4 S^4$ are provided with lugs $s s' s^2$, in the outer ends of which are mounted pins $s^3 s^3 s^3$, which pass through slots $s^4 s^4 s^4$, Fig. 49, in the dogs $S S' S^2$. The frames $S^4 S^4$ are held normally in position adjacent to the castings $A^2 A^2$ by means of springs $S^5 S^5$, herein shown as placed around the rods $R' R^2$ and bearing at their ends upon the said castings $S^4 S^4$ and upon collars $r' r^2$ upon said rods. The said dogs $S S' S^2$ stand normally in a rearwardly and inwardly inclined position, with their inner ends radially exterior to the outer surfaces of the clamp-bars $E E' E^2$ in such manner that said clamp-bars may freely pass the inner ends of the dogs as said clamp-bars move forward beyond the gibs, and the said free ends of the dogs rest at the rear of the clamp-bars when the latter are at the forward limit of their movement. The said dogs $S S' S^2$ are actuated so as to swing their inner free ends forwardly into contact with the rear ends of the clamp-bars (in such manner as to carry the latter forward) by contact of the forwardly-moving carriage with a moving part connected with the sliding castings $S^4 S^4$ after the cam-plates $Q Q' Q^2$ have been turned to release the clamp-bars by the action of the stationary stops $Q^3 Q^4 Q^5$.

The particular devices herein shown for moving the castings $S^4 S^4$ and the swinging clamp-bar-actuating dogs connected therewith are as follows: $R^3 R^3$ are two sliding rods arranged longitudinally and parallel with and between the frame-rods $R' R^2$. Said rods $R^3$ are attached at their rear ends to the castings $S^4 S^4$, and at their forward ends are constructed to slide in sockets $r^2 r^2$ in the frame-standards $R R$. Upon the said longitudinal rods $R^3 R^3$, near the forward ends of the latter, are rigidly secured two inwardly-extending arms $r^3 r^3$, Fig. 49, the inner ends of which are located in the path of the arms $B' B'$ of the carriage B, and in such position that the forward end of the carriage will strike said arms after the stops $Q^3 Q^4 Q^5$ have acted on the cam-plates $Q Q' Q^2$. The arms $r^3 r^3$ are herein shown as having sliding connection with the rods $R^3 R^3$ and as secured thereto by set-screws, whereby the position of the arms may be changed in adjusting the machine for operation. $r^4 r^4$, Fig. 49, indicate brace-rods connected with the arms $r^3 r^3$ near the free ends of the latter, extending rearwardly and bolted to the castings $S^4 S^4$. Said brace-rods $r^4 r^4$ are employed in the particular machine shown to lessen the lateral strain upon the arms $r^3$ by transmitting a part thereof directly to the castings $S^4$. The wipers I I extend from a point near the rear end of the castings $A^2 A^2$ to a point opposite the front end of the seam-folding device J and near the forward end of said castings $A^2$, the wipers being arranged to extend at the sides of the seam-folding device in order to hold the metal firmly against the mandrel during the time the seam is being folded. Said wipers are made adjustable radially toward and from the mandrel by means of slots $i i$ in the supporting-plate I' I', through which slots the bolts $i' i'$, for connecting said plates with the castings $A^3$, are inserted. Radial supporting-brackets $I^2 I^2$ are pivoted to the ends of the wipers, said brackets $I^2 I^2$ being adjustably secured to the castings $A^3 A^3$. The brackets $I^2 I^2$ are, as herein shown, Figs. 22 and 48, connected with the castings $A^3 A^3$ by means of longitudinal slots in the brackets, through which slots are placed bolts $i^2 i^2$, extending into the said castings. The said brackets $I^2 I^2$ are provided with devices for adjusting the wipers radially, consisting, as herein shown, of set-screws $i^3 i^3$, passing through outwardly-projecting lugs $i^4 i^4$ upon the brackets and engaging the upper surfaces of the plates $A^3 A^3$. Other set-screws $i^5 i^5$, passing through lugs $i^6 i^6$ on the castings $A^3$ and abutting against the upper edges of the plates I' I', are employed to force the brackets and wipers toward the mandrel. The inner or working faces of the wipers I I are conformed accurately to the parts of the mandrel against which they bear, as clearly shown in Figs. 9 and 48. When the machine is employed for making corrugated pipe, as herein illustrated, the wipers I I will commonly be made convex upon their working-faces and adapted to press the metal into the grooves of the mandrel, which are at either side of the seam of the pipe. The guide-plate K is rigidly secured in a vertical position over the mandrel between the rear ends of the wipers I I, said guide-plate serving to bend the marginal parts of the metal sheet upwardly or outwardly as the sheet is closed by the wipers against the upper surface of the mandrel, to thereby bring the said marginal part of the sheet nearly at right angles with the top surface of the mandrel, so that when the edges of the said sheet reach the folding devices they may be readily brought together thereby in a vertical plane. Said guide-plate K is herein shown as supported upon a rigid arm K', attached to the supporting frame or plate J' of the seam-folding device, the said arm K' being bolted to the rear end of the said plate J', as clearly illustrated in Figs. 22, 26, and 35. The side edges of the metal blank are so arranged with reference to the mandrel at the time of clamping it upon the latter that when the said blank is folded about the mandrel and its edges are brought together, as above set forth, one of its edges will stand considerably above the other edge, in the manner indicated in Fig. 42. This relative position of the edges of the blank is determined by means of a stop or gage $G^5$, Figs. 4, 1ª, 1ᵇ, and 23, located upon one of the folders G in position to engage one edge of the flat blank when the latter is thrust beneath the mandrel.

The seam-folding devices are more clearly shown in Figs. 2°, 22, and 26 to 43. The said seam-folding devices embrace five pairs of folding-dies $j\,j'$, $j^2\,j^3$, $j^4\,j^5$, $j^6\,j^7$, $j^8\,j^9$. These several pairs of dies are located in alignment with each other along the lower edge of the plate J'. The die-plates $j\,j'$, which first act upon the metal and which are located adjacent to and partially embrace the guide-plate K, are secured to the plate J' by the arm K', which supports the said guide-plate, said arm being arranged to overlap the said dies in the manner shown in Fig. 34. The several dies $j^2$ to $j^9$ are held upon the plate J' by means of separate clamp-plates $J^2\,J^2\,J^2$, which are bolted to the said plate J' in the manner shown. The said dies are provided at their upper edges with outwardly-extending flanges engaging notches or recesses in the plates J' and the clamp-plates $J^2$, whereby the said die-plates are held from vertical movement. The said plate J' is furthermore provided with a longitudinal groove $J^3$, engaged by lips $J^4$ upon the clamp-plates $J^2$, whereby the clamp-plates are interlocked with the plate J' and any relative movement of the parts thereby positively prevented. The first pair of dies $j\,j'$ operate to bring the adjacent marginal parts of the blank into contact with each other at right angles to the mandrel, thereby giving the form to the blank shown in Fig. 42. The vertical guide-plate K, which operates to bend the margins of the blank outwardly, as before described, is extended between the dies $j\,j'$ to about the middle of the length of the latter, and is tapered to a narrow or sharp edge at its front end, the surfaces of the dies opposing said guide-plate being correspondingly tapered, so as to gradually bring the margins of the blank together in advance of the end of the guide-plate K. The said dies $j\,j'$ are provided at their forward parts with opposing parallel walls, which force and hold the opposing vertical parts of the blank closely in contact with each other, as clearly shown in Fig. 33. The second pair of dies $j^2\,j^3$, in connection with the third pair $j^4\,j^5$, serve to bend the upper vertical part of the longer upturned margin over the shorter part of the upturned margin into the position shown in Fig. 43, while at the same time bending both of the marginal parts into an inclined or oblique position preparatory to the pressing or turning thereof flat upon the adjacent part of the tube to complete the joint. The appearance of the folded parts after having passed the dies $j^4\,j^5$ is shown in Fig. 43. The opposing dies $j^2\,j^3$ are provided with parallel inclined surfaces $j^{10}\,j^{11}$, Figs. 39 and 40, which serve to bend the margins of the blank into an oblique position. The die $j^4$, which is in advance of the die $j^2$, is provided at its end adjacent to said die $j^2$ with an inclined surface $j^{12}$, and with a spirally-curved surface $j^{13}$, connecting said surface $j^{12}$ with an inclined surface $j^{14}$, which latter surface is arranged parallel with and in opposition to a correspondingly-inclined surface of the die $j^5$, Fig. 31. The inclined surface $j^{12}$ and spiral surface $j^{13}$ serve to bend the marginal part of the longer flap over the shorter flap and into the position shown in Fig. 43. The die $j^2$ is provided with an extension or horn $j^{15}$, which overlaps the die $j^4$ in the manner shown in Fig. 39 and in dotted lines in Fig. 40, so as to hold or press the shorter flap against the longer flap while the margin of the longer flap is being turned over or against the shorter flap. The dies $j^6\,j^7\,j^8\,j^9$ serve to turn or press the parts folded into the shape shown in Fig. 43 downwardly against the body of the tube, generally in the same manner that the folding of the free edge of the longer flap is accomplished. The main parts of the dies $j^6\,j^7$ are provided with parallel inclined walls engaging opposite sides of the folded part. The die $j^8$ at its end nearest the die $j^6$, at the rear of it, is provided with an inclined surface $j^{16}$, adapted to engage and bend downwardly the parts folded, as above described, while at its opposite or forward end it is provided with an approximately flat lower surface $j^{17}$, acting to press or force the folded seam toward the mandrel. The said die $j^6$ is provided with a projection or horn $j^{18}$, tapered to a narrow or sharp edge at its forward end and made flat upon its under or bearing surface, so as to press and hold the part of the metal nearest the joint closely against the mandrel while the folded part is being turned down against the tube. The die $j^9$ operates to hold the metal adjacent to the joint closely to the mandrel while the folded parts are being bent over, and thereby aids in forming a close and compact joint.

At a point in advance of the seam-folding dies is located a seam-presser for more effectually closing or pressing the seam after it has been folded. Said seam-presser is as a special improvement made vertically movable with relation to the folding-dies and supported by spring-connection upon the supporting-plate J', whereby the said presser acts with a yielding pressure upon the seam. The folding-dies are made to fold the seam somewhat loosely, while the presser acts to set the seam closely down against the pipe. The final closing of the seam requires to be accomplished by spring-pressure, in order to prevent cutting of the metal, which is liable to occur in the use of a rigid pressing-die.

In the particular construction of the parts herein illustrated the seam-presser is constructed in detail as follows: The said presser consists of two plates $J^5\,J^6$, connected with each other and mounted to slide in a recess or opening of the plate J' between the lower part of said plate and a guide-plate $J^7$, bolted thereto. The plates or dies $J^5\,J^6$ are adjustably connected by means of a set-screw $j^{19}$, passing through a vertical slot in the plate $J^5$ into the plate J⁶. At its upper ends the die J⁶ is provided with a horizontal lug $j^{20}$, through which is inserted a set-screw $j^{22}$, which bears upon the upper end of the die J⁵ to enable the dies to be readily adjusted in position with relation to each other. To the upper end of said plate J⁶ is attached a vertical spindle J⁸, having sliding bearings at its upper end in a suitable guide-aperture formed, as herein shown, within a bushing $j^{21}$, having screw-threaded connection with the plate J'. About the spindle J⁸, between the lower end of the bushing $j^{21}$ and the top of the plate J⁶, is placed a spirally-coiled spring J⁹, which acts upon said plate J⁶ in such manner as to force both pressing-dies against or toward the mandrel. By turning the bushing $j^{21}$ the latter may be moved vertically to put the spring under greater or less tension, said bushing being herein shown as provided above the plate J' with jam-nuts to hold it from movement after it has been adjusted. The spindle J⁸ is shown as screw-threaded at its upper end and provided with a nut to limit the downward movement of the pressing-dies. The presser-die J⁵ is provided with a flat working-surface $j^{23}$, which rests centrally over the folded seam and presses the latter downwardly against the mandrel. The die J⁶ is provided with a working-surface $j^{24}$, located at one side of the seam and acting to press the metal adjacent to the overlapping margin into contact with the mandrel, and thus make the interior surface of the tube smooth. The location of the surfaces $j^{23}$ $j^{24}$ of the presser is clearly shown in Fig. 27.

The supporting-plate J' of the folding device is herein shown as sustained from one of the wiper-supports I' I' by means of a casting K², bolted to one of said supports, as hereinbefore set forth. The said plate J' is provided with vertical slots $k$, through which are inserted bolts $k'$, securing the plate to the said casting K². I have here shown in Figs. 22, 26, and 29 set-screws $k^3$ as inserted edgewise through the plate K' and bearing upon the bolts $k'$ within the slots $k$, said set-screws $k^3$ being employed to move the said plate J' vertically at one or both ends in adjusting the folding devices for operation. By moving the casting K² (which is of V shape in cross-sectional form) up or down upon the inclined plate I' the lateral position of the plate J' and folding-dies may obviously be adjusted, a vertical adjustment of said plate J' upon the casting K² being made at the same time to retain the proper vertical position of the folding-dies.

K³, Figs. 2ᶜ and 22, is a metal bracket adjustably secured to the yoke $a^3$ and engaging the forward end of the plate J', to additionally sustain said plate under the upward pressure thereon occurring in the formation of the seam. K⁴, Figs. 22 and 26, is an arm or lug affixed to one of the wipers I, extending over the rear end of the plate J' and provided with a set-screw $k^4$, arranged to bear vertically downward upon the upper edge of said plate J'. The arms or brackets K³ K⁴ are employed in the particular machine shown to hold the plate J' from upward movement in seaming heavy pipe; but when the parts are otherwise proportioned such brackets may not be necessary, or other supporting devices may be employed in their place.

It will be observed that the seam-folding devices are arranged in position to operate upon the sheet metal at the time that the clamp-bars E E' E² are held firmly against the mandrel by the cam-plates Q Q' Q². The seam is thus formed at a time when the sheet metal is held at all points closely and firmly in contact with the mandrel, thereby making the tube accurate in form and giving to all the tubes upon the same mandrel the same size, notwithstanding variations in the quality or characteristics of the metal employed.

In the seam-folding devices illustrated in the said prior application for patent two pairs of seaming-dies are shown as separately supported from the frame and separately adjusted relatively thereto, one of said pairs of dies being employed to turn one margin of the metal over the other, and the second pair to turn the seam flat against the tube. In the use of seaming-dies thus independently supported upon the frame it is found very difficult to adjust the dies for operation, inasmuch as the movement of one die requires the adjustment of all the other dies to retain the dies in alignment with each other and at the same time to maintain them in proper relation to the mandrel. The construction herein shown, wherein all of the dies are attached to a single supporting-plate J', which plate is adjustably secured to the frame, enables the dies themselves to be adjusted in proper relation to each other at a time when the supporting-plate is removed from the machine, while the plate itself, in placing it upon the machine, may be adjusted without trouble to the exact position required for proper operation of the dies upon the metal.

The spring detent or stripper L, which, as before stated, is mounted upon the frame-arms A² A² in advance of the seam-forming devices, consists, as herein shown, Figs. 2ᶜ, 8, and 10, of a sliding bar L', held in vertical guides L² L² upon a yoke $a^4$, attached at its ends to the said frame-arms, the detent being held down against the mandrel by means of a spring L³, acting against the top of the said bar L'. The part of the stripper engaged with the mandrel is preferably shaped to conform to the top surface of the latter, and, as herein shown, consists of a removable plate or shoe $l$, secured by a horizontal bolt $l'$ to the bar L', and provided with a curved or beveled end surface $l^2$ at its rear end, whereby the stripper will be lifted upon contact with the tube therewith in the forward movement of the mandrel. The spring L³ is herein shown as located between the top surface of the sliding bar L' and a follower $l^3$, which is held in position by means of set-screws $l^4$, Fig. 10, whereby the follower may be adjusted vertically to vary the pressure of the spring in a familiar manner. To limit the downward movement of the bar L', a rod $L^4$ is herein shown as secured to the upper end of the bar, and as passing upwardly through a cap-plate $L^5$, attached to the upper ends of the guides $L^2$, said rod being provided above the cap with a nut $l^5$, limiting the downward movement of the rod. At its forward edge or corner the plate or shoe $l$ of the stripper is made sharp or rectangular, so as to positively engage the edge of the metal at the rear end of the tube in the rearward movement of the mandrel. After the seam has been completed the mandrel is advanced with the tube to a point forward of the stripper L, and the clamp-bars E, E', $E^2$, D, and H are released from the blank in the manner hereinbefore described, the carriage is carried backwardly, and the detent or stripper L, engaging the rear edge of the tube, holds the latter from backward movement from the mandrel and carries it outwardly from between the clamp-bars. The stripper L is desirably provided with a horizontal arm $L^6$, extending forward of the corner or edge of the shoe, which engages the rear end of the tube. Said arm $L^6$ rests over the seam, and thereby prevents the latter from bending up or buckling in case any considerable pressure is brought on the end of the pipe in starting it from the mandrel.

As a further and special improvement in tube-making machines of the character herein shown, I provide at the forward end of the mandrel-support O a roller $O^{10}$, Figs. $2^b$ and 21, said roller being mounted upon said support and constructed to engage the under side of the finished tube at the time the mandrel is being moved backwardly, and after the lower clamp-bar has been disengaged from the mandrel. Said roller prevents sagging of the unsupported free end of the mandrel, such sagging of the mandrel being objectionable, inasmuch as it would be liable to allow the release of the stripper L from engagement with the rear edge of the tube and would also allow the mandrel to come in contact, or nearly so, with the lower clamp-bar D, and thus render impossible or difficult the insertion of the blanks beneath the mandrel. The said roller $O^{10}$ is herein shown as located upon the mandrel-support O at a point adjacent to the front end of the clamp-bar D, and as so arranged that it will stand forward of the mandrel at a time when the mandrel-support is advanced to hold the clamp-bar D against the mandrel, and will come under or beneath the end of the mandrel when said mandrel-support is drawn backwardly to release the said clamp-bar from the mandrel.

As an additional improvement in the machine shown in the said prior application, I have provided at the end of the machine at which the finished tube is stripped from the mandrel devices constructed to engage and support the tube as the mandrel is withdrawn therefrom and to discharge the tube at the side of the machine-frame. Devices for the purpose mentioned are herein shown in Figs. $1^c$, $1^d$, $2^c$, $2^d$, 8, and 11. T, in the said figures, is a horizontal shaft mounted at one side of the frame, and herein shown as supported at one end in a bracket $t$, attached to the bed A, and at its opposite end in a bracket $t'$, secured to the lower frame-rod R' near the frame-standard R. Attached to said shaft T are two arms T' T', adapted to swing upwardly by the rotation of the shaft to a point beneath and adjacent to the path of the mandrel, and to swing downwardly into an inclined or vertical position, so as to allow the finished tube deposited thereon to slide or roll from the arms. The tubes may be received upon suitable cross-pieces, as $T^2$, Figs. $1^c$, $1^d$, and 11, arranged at the side of the frame. Means are provided for automatically actuating the shaft T in such manner that the said arms T' will be swung upwardly beneath the tube after the carriage B has passed the rearmost arm T' in the backward movement of said carriage, and to drop the arms and discharge the finished tube after the carriage and mandrel have been retracted to a point at the rear of the stripper L and have become entirely disengaged from the tube.

As far as the general features of construction in the tube receiving and discharging devices above described are concerned, any suitable devices acted upon by one of the moving parts of the machine may be employed to actuate the shaft T in the manner above described. As herein shown the shaft is actuated by means of a pin $T^3$, Fig. 7, secured in the side of the carriage B and constructed to engage a cam-groove $t^3$, formed in a cylindric revolving cam $T^4$, which is arranged in alignment with and attached to the end of the shaft T. Said cylindric cam $T^4$ is so arranged in the machine shown that it extends inwardly between the frame-arms $A^2$ $A^2$ at a point between the dogs S S' and the gibs F F' at one side of the machine, and is provided with a bearing $t^4$, attached to the inner face of one of the said frame-arms $A^2$, as clearly shown in Fig. $2^c$. The cam-groove $t^3$ extends longitudinally of the cylindric cam and is provided with inclined or spiral parts $t^5$ $t^6$ near its ends, which make a turn about the cam of about one-fourth of the circumference of the latter. The said spiral parts $t^5$ $t^6$ of the cam-groove are so arranged that when the pin $T^3$ engages the spiral part $t^6$ at the forward end of the cam in the rearward movement of the carriage the arms will be swung upwardly to receive the tube, and when the said pin reaches the part $t^5$ at the rear end of the mandrel the arms will be swung downwardly to discharge the tube, the intermediate straight part of the cam-groove between the parts $t^5$ and $t^6$ being arranged to hold the arms horizontal while the mandrel is being withdrawn from the tube. In the forward movement of the carriage the pin $T^3$, in passing through the cam-groove, will actuate the arms $T'$ $T'$, but of course without interfering with any of the other parts of the machine. The weight of the arms $T'$ $T'$ may be relied upon to hold the cam $T^4$ in position for the engagement of the pin $T^3$ with the cam-groove in the advance movement of the carriage; but to prevent the possibility of shifting the cam by accident a rope $t^7$ is attached to an arm upon the outer surface of the cam, said rope passing over a pulley $t^8$, mounted upon the adjacent frame-rod $R^2$ and having attached to its end a weight $T^5$, which weight tends to hold the cam $T^4$ and rod $T$ in position, with the arms $T'$ hanging down.

$T^6$, Fig. $2^c$, is a stop for limiting the outward and downward movement of the arms $T'$. I have herein shown the said arms $T'$ as provided at their outer ends with laterally-adjustable sections $t^9$, upon which the pipes are received. Said sections $t^9$ may be moved vertically when the arms are in a horizontal position, and thus brought accurately into position to receive tubes of different sizes and to sustain the tubes horizontal and without allowing any sagging or falling of the free ends of the latter while the mandrel is being withdrawn therefrom. The connection between the main part of the arms $T'$ and the adjustable sections $t^9$ thereof is herein shown as formed by bolts $t^{10}$, Fig. 11, inserted through slotted arms attached at right angles to the parts.

As a further and special improvement in pipe-making machines, I have provided, in connection with stationary seam-folding devices and the movable carriage carrying the tube forward to cause the action of the seam-folding devices thereon, an oil-supply tube or tubes arranged to discharge upon the seaming or folding dies, together with automatic means controlling a valve in said oil-supply pipe, whereby oil is discharged upon the seam-folding dies at the time the metal is being acted upon by the latter.

In the drawings, Figs. $1^b$, $1^c$, $2^b$, $2^c$, 7, 14, and 15, U is an oil-supply tank, and $U'$ is a pipe leading downwardly from said tank and extending horizontally over the seam-folding devices. $u$ $u$ are branch tubes or leaders extending downwardly from the tube $U'$ to the vicinity of the folding-dies. $U^2$ is a valve in the pipe $U'$, provided with an actuating-arm $u'$, arranged to swing in a vertical plane. $U^3$ is a vertically-sliding bar mounted in a bracket $U^4$, secured to the upper end of the frame-casting $A^2$ and provided with a pin $u^2$, which engages a longitudinal slot in the valve-arm $u'$. To the lower end of the sliding bar $U^3$ is pivoted a swinging dog $u^3$, which is located in the path of a longitudinal cam-bar $u^4$ upon the upper end of one of the arms $B'$ of the carriage B. The dog $u^3$ has an arm $u^5$, serving as a weight to hold it normally in position to engage the cam-bar $u^4$, a stop $u^6$ serving to limit the motion of the dog under the weight of the arm. In the forward movement of the carriage B the cam-bar $u^4$ engages the inclined surface $u^7$ of the dog $u^3$ and lifts said dog and the slide-bar and holds them elevated and the valve of the oil-pipe open during the time the seaming is being accomplished. When the cam-bar passes forward of the dog $u^3$, the parts drop by their own weight, and thereby close the valve. In the rearward motion of the carriage the cam-bar strikes the lower end of the dog $u^3$, and the latter, being free to swing backwardly upon its pivot, is thrown backwardly and upwardly and passes over the cam-bar without moving the slide-bar and valve. The arm $u^5$ tends to swing the dog downwardly, and after the cam-bar has passed to the rear of and is free from the dog said arm $u^5$ returns the dog into position to engage the said cam-bar in the next subsequent forward movement of the carriage.

The driving-shafts $P'$ and $O^3$, by which the mandrel-support O and the carriage B are actuated, may be started, stopped, and reversed, so as to give the desired relative movements to the several parts by any suitable mechanism actuated either by hand or by the movement of the machine.

The present invention embraces improvements in the means for actuating the several parts, whereby the latter may be easily and conveniently controlled by the operator. Such devices are made as follows:

To first describe the device shown for starting forward the mandrel-support O, said device is more clearly shown in Figs. $1^a$, 3, and 23, and consists of a longitudinally-sliding belt-shifter V, engaging the belt $O^9$, belonging to the pulleys $O^6$ and $O^7$, by which the mandrel-support is driven forward. Said belt-shifter is held in position to retain the belt upon the loose pulley $O^7$ by means of a spring $V'$, connected with a pin $v$ upon the shifter and the adjacent frame-post $a'$. For actuating the said belt-shifter a transverse rock-shaft $V^2$ is provided extending across the machine-frame and having at its end adjacent to the belt-shifter an upwardly-extending crank-arm $v'$, connected with the said shifter. At its opposite end said rock-shaft $V^2$ is provided with a hand-lever $V^3$.

Motion is communicated to the carriage B, for the purpose of moving the same longitudinally, by means of gearing driven from one of the two pulleys $P^5$ and $P^6$, through the medium of a double clutch connected with a sliding sleeve $p^7$, as hereinbefore set forth. For actuating the said clutch by hand to start the carriage in its forward movement devices are provided as follows: W is a lever pivoted at its upper end to a bar $w$, attached to the frame-pieces $A^5$ $A^5$ of the machine and connected at its lower end with the said sleeve $p^7$. Attached to the lever W is a rod $W'$, which extends rearwardly to a point adjacent to the rear end of the machine-frame, and is there connected to a transverse rock-shaft $W^2$, mounted in the machine-frame and having upon its end at the opposite side of the machine a hand-lever $W^3$, the devices herein shown for connecting the rod $W'$ with the shaft consisting of a connecting-rod $w'$ and a crank-arm $w^2$ upon the rock-shaft. Said bar $W'$ is also connected with a lever $W^4$, forming part of a device for automatically actuating the said clutch, as will hereinafter fully appear.

The folding of the blank upwardly about the mandrel by the folders G G is, as hereinbefore described, accomplished by a preliminary forward movement of the carriage B. It becomes necessary, therefore, in the operation of the machine, to first start the carriage and allow it to move forward a short distance and then stop said carriage and start forward the mandrel-support and mandrel for carrying the latter, together with the blank, forward upon the carriage and between the clamp-bars mounted thereon. The automatic devices above referred to, of which the lever $W^4$ forms a part, are constructed to actuate the sleeve $p^7$ of the clutch mechanism in such manner as to release the clutch and arrest the forward movement of the carriage when the folders G have been lifted, and also after the carriage has reached the forward limit of its movement.

To first describe the said automatic devices by which the carriage B is stopped after having completed its forward movement, the lever $W^4$ is pivoted between its ends upon a bracket $w^3$, with its upper end opposite the side of the carriage and its lower end approximately in alignment with the actuating-rod $W'$, with which said lever is connected, Figs. 44, 45, and 46. To the said lever $W^4$, above its pivotal point, is attached a rod $W^5$, which extends forwardly along the machine-frame, as shown in Figs. 1ª and 1ᵇ, to a point somewhat in the rear of the rear end of the frame-castings $A^2$ and to a point inside of the forward frame-arm $A^5$, Fig. 1ᵇ. The said rod $W^5$ is provided at this point with an inwardly-turned end $w^4$, Fig. 5, which is constructed to engage a stop or projection $w^5$ upon the side of the carriage B. The said stop or projection $w^5$ is located near the rear end of the carriage, Fig. 1ª, and is so arranged that it will strike the end $w^4$ of the rod $W^5$ at the time the carriage has completed its forward movement. The contact of the said stop $w^5$ with the end $w^4$ carries the rod $W^5$ forward, thereby swinging the upper end of the lever $W^4$ forwardly and drawing the rod $W'$ in the opposite direction, so as to move the sleeve $p^7$ of the clutch, Fig. 1ᵇ, in a direction to release the shaft $P^4$ from the pulley $P^5$, by which the carriage is driven forward.

The devices herein shown for automatically stopping the carriage after it has moved forward a sufficient distance to lift the folders G G are made as follows: At the upper end of said lever $W^4$ is located a longitudinally-arranged cross-head $W^6$, having at its forward end an upwardly-extending prong $w^6$ and at its rear end a second upwardly-extending prong $w^7$. Upon the side of the carriage B is mounted a pivoted dog $W^7$, (herein shown as pivotally supported upon a stud $w^8$, affixed in a casting $W^8$, bolted to the said carriage,) the said dog $W^7$ being pivoted in such manner as to swing in the same plane with the lever $W^4$. The said dog $W^7$ is, furthermore, pivoted near its upper end, and is held in a generally vertical position by means of a spring $w^9$, attached to the upper end of said dog and to a pin $w^{10}$ upon the casting $W^8$. Said spring $w^9$ holds the lower end of the dog $W^7$ in contact with a lug or stop $w^{11}$ upon the casting $W^8$, the said stop being so arranged as to hold the lower end of the dog from rearward movement. The end of the dog $W^7$ is so arranged with relation to the prong $w^6$ of the lever $W^4$ that when the lower end of said lever $W^4$ is swung forward, as will be its position when the clutch is engaged with the pulley by which the carriage is moved forward, said prong $w^6$ will stand in the path of the said dog. The said prong $w^6$ of the lever $W^4$ is arranged, furthermore, in such position longitudinally with relation to the dog that said dog will encounter the prong shortly after the carriage has been carried forward a sufficient distance to lift the folders G G, the said dog operating by its contact with the arm or prong to swing the upper end of the lever $W^4$ forward, and thereby actuate the rod $W'$ to release the clutch from the drive-pulley with which it is engaged, and thus stop the forward movement of the carriage. After the forward motion of the carriage has been stopped in the manner described the belt-shifter V is moved by hand to throw the belt $O^9$ upon the drive-pulley $O^6$, and thus carry forward the mandrel. After the mandrel has reached the forward limit of its movement its motion is stopped by means of the belt-shifter V, and the carriage is again started forward by the actuation of the clutch-actuating rod $W'$ through the medium of the hand-lever $W^3$. The dog $W^7$, after it has moved or shifted the lever $W^4$ by contact with the prong $w^6$ thereof, in the manner above described, remains immediately behind said prong and in position to prevent the movement of the lever $W^4$ in a direction to engage the clutch with the pulley by which the carriage is driven forward. Unless the said dog is first moved or swung out of the way of the said prong therefor, the actuation for starting the carriage of the rod $W'$ (which is connected with and moves the lever $W^4$) cannot be accomplished. The said dog is pivotally supported in a manner to allow its lower end, which is adjacent to the prong $w^6$, to be swung upwardly and forwardly for freeing it from the said prong, and devices are provided for moving said dog in the manner described at the same time and by the same act that the belt-shifter V is moved for starting and stopping the mandrel, so that after the mandrel has been stopped the parts will be in position to allow the actuation of the lever $W^4$ and the clutch device for starting the carriage. Said devices for moving the dog $W^7$ are made as follows: $V^4$ is a horizontal arm attached to and forming a continuation of the shifter V and extending forwardly from the latter to a point over and adjacent to the prong $w^6$ of the lever $W^4$. In the extreme forward end of said arm $V^4$ is mounted a swinging detent $v'$, which is located at the side of the arm $V^4$ nearest the carriage, and is provided with an inclined surface $v^2$ at its forward and inner margin, and is provided at its rear end with a transverse end surface $v^3$. The said detent is held outwardly from the arm by means of a spring $v^4$, Fig. 46, said spring holding the said detent in position with its inclined surface $v^2$ and transverse end surface $v^3$ in the path of an upwardly-projecting arm or lug $w^{11}$ upon the upper end of the dog $W^7$. The end surface $v^3$ of the spring-detent $v'$ is so located with reference to the prong $w^6$ that when the carriage has been stopped by the engagement of the said dog with the prong the lug $w^{11}$ will stand somewhat in advance of the said detent. This position of the lug and detent is shown in Fig. 47. The said lug is enabled to pass forward of the detent $v'$, without catching upon the end surface $v^3$ thereof, by means of a device provided for the purpose, consisting of a pivoted arm $V^5$, arranged longitudinally adjacent to the bar $V^4$ and constructed to bear at its end against a pin $v^4$ in the free end of the detent $v'$, said lever $V^5$ being pivoted at $v^5$ upon a stationary pivot and being held by means of a spring $v^6$ with its end adjacent to the detent in position to be engaged by a striker $V^6$, secured to the side of the carriage. As the carriage moves forward the striker $V^6$, acting upon the lever $V^5$, which stands in an inclined position in the path of said striker, thrusts the free end of said lever backwardly, and thereby carries the detent $v'$ outwardly a sufficient distance to allow the lug $w^{11}$ to pass the detent. After the striker has passed the end of the lever $V^5$ the latter returns to its normal position, and the detent $v'$ is thrown outwardly by its actuating-spring. After the dog $W^7$ and the lug $w^{11}$ have passed forward of the spring-detent $v'$ said lug will stand in advance of the said detent and in the path of the detent when the arm $V^4$ is moved forward, as clearly shown in Fig. 47. If when the parts are in the position shown in said Fig. 47 the belt-shifter V is moved forward to carry the belt $O^9$ upon the belt-pulley $O^6$, the arm $V^4$ will also be carried forward and the detent $v'$ will be thrust against and carried past the lug $w^{11}$, said detent yielding backwardly toward the arm by the action of the lug upon its inclined outer face, and then springing forward after it has passed the lug, so as to bring its end surface $v^3$ forward of and in position to engage the said lug. The parts commonly remain in the position last above described until the mandrel has reached the forward limit of its movement upon the carriage, at which time the belt-shifter V is thrown backwardly to shift the belt $O^9$ to the loose pulley, carrying with it the arm $V^4$ and detent $v'$, which latter in coming in contact with the lug $w^{11}$ throws the said lug backwardly and the lower end of the dog $W^7$ upwardly and forwardly and free from the prong $w^6$, thus leaving the lever $W^4$ free to be moved. The parts are so arranged that when the belt-shifter V and arm $V^4$ are returned to their rearmost position the detent $v'$ rests over in contact with the lug $w^{11}$, and thereby sustains the dog $W^7$ in its elevated or horizontal position. After the carriage has been started and moves forward, however, the dog will pass out from beneath the detent $v'$, and will thereby be allowed to fall into its vertical position and will be in readiness to again engage and actuate the lever $W^4$ upon the return or backward movement of the carriage in a manner which will now be described. The prong $w^7$ at the upper end of the lever $W^4$ is somewhat longer than the prong $w^6$ and extends upwardly such distance that when the upper end of the lever $W^4$ is swung forward in such manner as to hold the clutch in position for driving the carriage backward the upper end of said prong $w^7$ will stand in a position to engage the rear side of the dog $W^7$ at a point opposite or above the pivot-stud $w^8$ of said dog. It follows from this construction that as the carriage moves rearwardly the said dog $W^7$ (which, as before described, stands in a vertical position in the rearward movement of the carriage) will encounter the said prong $w^7$, and thereby force the upper end of the lever $W^4$ backwardly until the clutch is released from the driving-pulley, thereby stopping the backward movement of the carriage. After the carriage B is thus returned to its rearward position the several parts of the automatic clutch-actuating devices will stand in the relative positions shown in Figs. 44, 45, and 46. In the rearward movement of the dog $W^7$ beneath the spring-detent $v'$ the lug $w^{11}$ in moving past the detent strikes the inclined surface of the said detent and thrusts the latter backward out of the way. In order to prevent the catching of the striker $V^6$ against the end of the lever $V^5$ in the backward movement of the carriage, said striker is provided with a rearwardly and inwardly extending guide-arm $v^8$, constructed to engage the free end of the lever $V^5$, and thereby throw the latter inwardly as the striker passes it. In the particular construction of the said lever $V^5$ herein shown the latter is mounted upon a rigid arm $V^7$, attached to an adjacent part of the machine-frame. Said arm $V^7$ is provided with a stop $v^7$, limiting the outward or backward movement of the free end of the lever $V^5$ under the action of the spring $v^6$, thereby holding the said lever $V^5$ in position for engagement of the striker therewith.

In the machine herein shown the mandrel is driven backwardly upon the carriage by a belt-shifting device controlling the belt $O^8$, by which motion is transmitted to the shaft $O^3$ in a direction to move the mandrel-support O backwardly. Such belt-shifting device is preferably separate from any other operative part of the machine, so that it may be controlled independently by hand. Said belt-shifting device consists of a sliding shifter X, mounted in a guide-block $X'$ and held in position to retain the belt upon the loose pulley $O^5$ by means of a spiral spring $x$. The belt-shifter X is moved by means of a hand-lever $X^2$, Fig. 23, pivoted to the shifter and to the block $X'$, said hand-lever being desirably located at the side of the machine adjacent to the hand-levers $V^3$ and $W^3$, whereby all of the levers for controlling the machine will be in position convenient for the operator standing at the side of the machine near its end.

In a machine embracing the main features of the construction above described the lower clamp-bar D will be forced into contact with the mandrel by a preliminary movement of either of the mandrel-support O or of the carriage itself. The fact that the said clamp may be actuated in either of the ways described will be rendered clear from the fact that the mandrel is held from movement during the time the clamp-bar D is being lifted by means of the detent $C^2$, and the clamp-bar is connected with the mandrel, so that the mandrel-support O, which is provided with inclined surfaces, acting upon the clamp-bar, will be moved forward in the same manner by a forward movement of the carriage, upon which it is supported, as by a movement of the mandrel-support upon the carriage. In either case the projection $o^2$, by which the detent $C^2$ is lifted to free the mandrel, is carried forward, so as to engage the arm $c^2$ of said detent, and thereby release the detent after the mandrel-support has moved far enough forward to bring the clamp-bar D into engagement with the mandrel.

To aid in giving a better understanding of the construction and operation of the machine, the several steps in the operation of the machine in making a length of pipe will now be described. When the machine is in position for the insertion of the blank, the carriage B, mandrel C, and mandrel-support O are at the rearward limit of their movement, the clamp-bar D is depressed, and the abutment-bar M is in contact with the top of the mandrel. The blank is inserted below the mandrel and over the clamp-bar, as hereinbefore explained, and the carriage is then started forward by actuating the hand-lever $W^3$ in such manner as to shift the sleeve $p^7$ of the clutch connecting the driving-pulleys $P^5$ $P^6$ with the shaft $P^4$, whereupon the shaft $P'$ is rotated and the carriage advanced. Such advance movement of the carriage and the mandrel supported thereon operates to lift the lower clamp-bar D against the blank, thereby clamping the same against the mandrel, the mandrel being held from forward movement with the mandrel-support by means of the latch or detent $C^2$, which is engaged with the rear end of the slide-bar $M'$, the forward end of which is connected with the mandrel by the detent $C^3$ during the movement of the mandrel-support. As soon as the clamp-bar has been lifted the cam-shaped forward end of the projection $o^2$ engages the lower end of the arm $c^2$ of the detent $C^2$ and lifts the latter so as to release the sliding-bar $M'$ and the mandrel, so that said parts may move forward with the mandrel-support. After the clamp-bar D has been lifted to clamp the blank against the mandrel the carriage continues its forward movement, and the folders G G are lifted to fold or bend the blank into U shape by the action of the stationary rollers $G^2$ $G^2$ on the inclined surfaces of the bars $G'$ $G'$. As hereinbefore stated, the clamp-bar D may be lifted by a preliminary movement on the carriage of the mandrel-support O, and in such case said mandrel-support will be first advanced a short distance upon the carriage by actuating the hand-lever $V^3$ in such manner as to shift the belt $O^9$ and rotate the shaft $O^3$, and the motion of the said shaft will be stopped as soon as the clamp-bar is lifted, after which, the mandrel having been released, the carriage and the mandrel will be started forward to operate the folders G G. It will usually be preferred, however, to operate the clamp-bar by starting the carriage, so that both the actuation of the clamp-bar and the folders will take place by the movement of the carriage before the mandrel and mandrel-support are moved. During the forward movement of the carriage the clamp-bars H H are advanced against the mandrel by the rollers $h^2$ $h^2$ on the shaft $H'$, engaging the cam-grooves $h^3$ $h^3$ in the casting $H^3$. After the folders have been lifted the forward movement of the carriage is automatically arrested by the contact of the dog $W^7$ with the prong $w^6$ of the lever $W^4$, by which the rod $W'$ is actuated to release the clutch from the drive-pulley with which it is engaged. The forward movement of the carriage having been stopped in the manner described, the belt-shifter V is then moved by means of the hand-lever $V^3$ to throw the belt $O^9$ upon the drive-pulley $O^6$, and thus operate the shaft $O^3$ to carry forward the mandrel-support and mandrel upon the carriage. In the advance movement of the mandrel on the carriage the blank which is clamped to the mandrel by the clamp-bars D and H H, is carried forward with the latter from between the folders G G and into the space between the arms $B'$ $B'$ of the carriage and the clamp-bars E $E'$ $E^2$ thereon. In such forward movement of the mandrel the abutment-bar M and slide-bar $M'$ will be carried forward with the same by the engagement of the forward end of the mandrel with the detent $C^3$ upon the slide-bar, said abutment-bar taking the upward thrust of the said clamp-bars on the mandrel, as hereinbefore set forth. At the termination of the forward movement of the mandrel on the carriage the mandrel will stand between the arms $B'$ $B'$, and the clamp-bars D and H H will have been advanced to form the three bottom corrugates in the blank. The forward movement of the mandrel is arrested by operating the belt-shifter V through the medium of the hand-lever $V^3$. The carriage is again started forward after the mandrel has ceased its forward movement on the carriage by actuating the clutch-sleeve $p^7$ by means of the hand-lever $W^3$ and actuating-rod $W'$. In such movement of the carriage the cam-plates Q $Q'$ $Q^2$ are first brought into contact with the gibs F $F'$ $F^2$, by which the clamp-bars are thrust obliquely inward against the mandrel. As soon as the clamp-bars E $E'$ $E'$ are closed against the mandrel, thereby forming the corrugations at the sides of the mandrel and holding the same firmly in position, the detent $C^3$ is disengaged from the forward end of the mandrel by the contact of the roller $M^5$ with the inclined surface $c^6$ of the vertical slide-bar $C^4$, by which the said detent $C^3$ is lifted clear of the mandrel. At the same time that the slide-bar $C^4$ is moved the plate $M^6$, attached thereto, will be lifted, thereby thrusting the abutment-bar backwardly and freeing it from the mandrel. The abutment-bar and sliding bar $M'$ then remain stationary, while the carriage-mandrel and blank continue their forward movement. Shortly after the abutment-bar is released the front end of the blank encounters the wipers I I, by which the metal between the upper clamp-bars $E^2$ $E^2$ and adjacent to the seam is pressed into contact with and made to conform to the surface of the mandrel, and the edges of the blank are then acted upon by the seam-folding devices by which the seam is made, in the manner hereinbefore fully set forth. After the rear end of the blank has passed forward of the seam-folding devices the motion of the carriage and mandrel is continued until the said parts have passed forward of and are free from the castings $A^2$ $A^2$, when the several clamp-bars D H H E $E'$ $E^2$ are actuated to release the blank. The clamp-bar D is retracted by a slight rearward movement of the mandrel-support O upon the carriage when the mandrel is still gripped by the clamp-bars E $E'$ $E^2$, the mandrel and the clamp-bar connected therewith being held immovable on the carriage by said clamp-bars, while the mandrel-support is shifted rearwardly, with the result of allowing the clamp-bar to fall away from the mandrel. Such rearward movement of the mandrel-support is accomplished by moving the belt-shifter X by hand, so as to give a reverse motion to the shaft $O^3$. After the clamp-bar D has been released the clamp-bars H H are retracted by the engagement of the radial arm $H^5$, on one side of the shafts $H'$, with the stationary cam-plate $H^6$, and the several clamp-bars E $E'$ $E^2$ are thereafter first released by the action of the stops $Q^3$ $Q^4$ $Q^5$ upon the cam-plates Q $Q'$ $Q^2$, and then retracted by the action of the actuating-dogs S $S'$ $S^2$ upon the rear ends of the said clamp-bars. After the said several clamp-bars have been retracted the carriage is stopped at the forward limit of its movement and then reversed by means of the hand-lever $W^3$, operating to throw the sleeve $p^7$ of the reversing-clutch. As the carriage and mandrel start backward the rear edge of the pipe on the mandrel is caught by the stripper L, and the mandrel is held thereby from rearward movement, so that the mandrel is withdrawn from within the pipe. The pipe is received upon the arms $T'$ $T'$ as soon as it is free from the mandrel, and said arms are swung downwardly with the pipe by the action of the pin $T^3$ on the carriage in the cam $T^4$, as hereinbefore fully set forth. After the pipe has been stripped from the mandrel the rearward movement of the carriage is allowed to continue until the rearward limit of its throw is reached, and during such rearward movement of the carriage the belt-shifter X is preferably moved so as to give a reverse rotation to the shaft $O^3$, so that the mandrel-support and mandrel will move backwardly on the carriage during the backward movement of the latter, and the mandrel will be in position for the insertion of another blank as soon as the carriage ceases its backward movement. When the mandrel in its backward movement reaches a point beneath the abutment-bar M, the shoulder $c^9$ of the mandrel strikes the arm $M^7$ and carries the said abutment-bar and the sliding bar $M'$ backwardly with it, and shortly after such backward movement of the slide-bar and abutment-bar begins the upper end of the sliding bar $C^4$ strikes the inclined surface $N'$, at the forward end of the stringer $n'$, and the said sliding bar is depressed, with the result of forcing the abutment-bar downwardly against the mandrel, and of engaging the detent $C^3$ with the forward end of the mandrel, as hereinbefore described. The slide-bar and abutment-bar move backwardly with the mandrel until the latter reaches the rearward limit of its movement, so that the abutment-bar is in contact with the mandrel and in readiness to take the upward thrust of the clamp-bar D as soon as said clamp-bar is lifted to clamp a new blank against the mandrel.

The machine herein shown is constructed especially for making cylindric longitudinally-corrugated tubes; but as far as the operation of the seaming devices is concerned the particular form of the mandrel is unimportant and the latter may be cylindric, square, or of other forms, the working-faces of the clamp-bars in all cases of course being conformed to the shape of that part of the surface of the mandrel with which they come in contact. The number of clamp-bars or clamps may of course be greater or less than shown, with the same general results as far as the operation of the clamps themselves or of the seaming devices is concerned.

One main feature of improvement in the machine shown in this application over that illustrated in the prior application, Serial No. 182,168, is embraced in devices for actuating the radially-movable clamp-bars E E' E² both for forcing forward and retracting the said clamp-bars. In the present machine said clamp-bars are actuated positively both in advancing and retracting them, and the features of construction whereby such positive movement of the clamp-bars is obtained are herein broadly claimed.

Another principal feature of improvement embraced in the machine shown consists of the abutment-bar for taking the upward thrust of the mandrel, together with the traveling support for said bar. In the machine shown in said prior application the mandrel is held down against the upward pressure of the lower clamps by means of rollers arranged to bear at intervals upon the mandrel. Such rollers failed to give the positive and rigid resistance desirable for the perfect working of the machine in making very heavy tubes.

The machine herein illustrated also embraces other features of improvement, as pointed out in the appended claims.

I claim as my invention—

1. The combination, with a longitudinally-movable mandrel, and clamps for holding the metal blank upon the mandrel, of stationary wipers constructed to bring together over the mandrel the marginal parts of the blank, and stationary seam-folders, substantially as described.

2. The combination, with a longitudinally-movable mandrel, and clamps for holding the metal blank upon the mandrel, of stationary wipers constructed to close the marginal parts of the blank over the mandrel, a stationary guide-plate engaging the inner faces of the blank, and stationary seam-folders, substantially as described.

3. The combination, with a longitudinally-movable mandrel, and clamps for holding the metal blank upon the mandrel, of stationary wipers constructed to bring together over the mandrel the marginal parts of the blank, and stationary seam-folders, the said wipers being extended to a point near the forward end of the seam-folders at either side of the latter, whereby the metal is held in contact with the mandrel during the time the seam is being formed, substantially as described.

4. The combination, with the machine-frame, a longitudinally-movable mandrel, and stationary seam-folders mounted upon the frame, of a seam-presser having yielding connection with the frame, substantially as described.

5. The combination, with the machine-frame, a longitudinally-movable mandrel, and clamps for holding the metal blank upon the mandrel, of seam-folding devices comprising a plate having adjustable connection with the said frame, and folding-dies attached to said plate, substantially as described.

6. The combination, with the machine-frame, a longitudinally-movable mandrel, and clamps for holding the metal blank upon the mandrel, of stationary seam-folding dies, a yielding seam-presser, and a plate J', having adjustable connection with the said frame and sustaining said folding-dies and presser, substantially as described.

7. The combination, with the machine-frame, a longitudinally-movable mandrel, and clamps holding the metal blank upon the mandrel, of stationary seam-folding dies, a plate J', sustaining said dies, and a casting or bracket of V shape in cross-section, said bracket being adjustably secured to an adjacent inclined surface of the frame, and the plate J' being adjustable upon said bracket toward and from the mandrel, substantially as described.

8. A seam-folder comprising dies, as $j^2 j^3 j^4 j^5$, and a plate J', sustaining said dies, one of the said dies, as $j^4$, being provided with an inclined or spiral surface for bending the metal, and the adjacent die in alignment therewith, as $j^2$, being provided with a prong, as $j^{14}$, overlapping the said bending-die, substantially as described.

9. The combination, with folders for bending one edge of the metal blank over the other edge thereof, comprising dies $j^2$ and $j^4$, one of which is provided with a bending-surface $j^{13}$ and the other with a prong $j^{14}$, of folders constructed to bend down the parts folded by the first folders, embracing dies $j^6$ and $j^8$, one of which is provided with a bending-surface $j^{16}$ and the other with a prong $j^{18}$, substantially as described.

10. A seam-folding device consisting of a guide-plate K, folding-dies $j\ j'$, for bringing the margins of the metal blank together, dies $j^2 j^3 j^4 j^5$, for folding one edge of the blank over the other edge thereof, dies $j^6 j^7 j^8 j^9$, for folding the parts flat against the tube, and a plate J', sustaining said several dies, substantially as described.

11. The combination, with the machine-frame, a longitudinally-movable mandrel, and clamps for holding the metal blank upon the mandrel, of radially-movable wipers I I, radially-arranged plates I' I', sustaining said wipers, set-screws inserted in the frame and bearing against the plates for holding the wipers adjacent to the mandrel, radially-sliding bars I² I², connected with said plates I' I', and set-screws in said bars bearing against the frame for adjusting the position of the wipers, substantially as described.

12. The combination, with a longitudinally-movable mandrel, of clamps for holding the metal blank in contact with the mandrel, comprising two or more clamp-bars movable longitudinally with the mandrel, and also movable obliquely toward and from the latter, pivoted cam-plates constructed to act upon the said clamp-bars for moving the latter obliquely, and stationary parts or surfaces engaging the said cam-plates in the forward movement of the mandrel and clamp-bars, substantially as described.

13. The combination, with a mandrel, of means for holding the metal in contact with the mandrel, comprising clamp-bars movable obliquely toward and from the mandrel, pivoted cam-plates constructed to act upon the ends of the said clamp-bars, backwardly and outwardly yielding gibs located in position to engage the said cam-plates, the mandrel, clamp-bars, and cam-plates having a bodily longitudinal movement relatively to the gibs, substantially as described.

14. The combination, with a longitudinally-movable mandrel and stationary seam-folders, of clamps for holding the metal in contact with the mandrel, comprising two or more clamp-bars movable with the mandrel, and also movable obliquely toward and from the latter, pivoted cam-plates constructed to act upon the clamp-bars for moving the latter obliquely, said cam-plates being constructed to engage immovable parts or surfaces upon the machine-frame in the forward movement of the mandrel and clamp-bars, substantially as described.

15. The combination, with the machine-frame, of a longitudinally-movable mandrel, a carriage sustaining the mandrel, two or more clamp-bars mounted in the carriage and movable therein obliquely toward and from the mandrel, pivoted cam-plates mounted upon the carriage and engaging the ends of the clamp-bars, and stationary parts or surfaces upon the machine-frame engaging said cam-plates in the forward movement of the carriage, substantially as described.

16. The combination, with the machine-frame, of a longitudinally-movable mandrel, a carriage sustaining the mandrel, two or more clamp-bars mounted in the carriage and movable therein obliquely toward and from the mandrel, pivoted cam-plates mounted upon the carriage and engaging the said clamp-bars, and two or more gibs located upon the machine-frame in position to engage and actuate the said cam-plates in the forward movement of the carriage, substantially as described.

17. The combination, with the machine-frame, of a longitudinally-movable mandrel, a carriage sustaining the mandrel, two or more clamp-bars mounted in the carriage and movable therein obliquely toward and from the mandrel, two or more gibs located upon the machine-frame, and pivoted cam-plates mounted upon the carriage and engaging the forward ends of the clamp-bars, the said cam-plates being located in position to engage the rear ends of the gibs in the forward movement of the carriage, substantially as described.

18. The combination, with the machine-frame, of a longitudinally-movable mandrel, a carriage sustaining the mandrel, two or more clamp-bars mounted in the carriage and movable therein obliquely toward and from the mandrel, pivoted cam-plates mounted upon the carriage and engaging the clamp-bars, stationary parts or surfaces, as the ends of the gibs F F' F$^2$, constructed to engage and turn in one direction the said cam-plates in the forward movement of the carriage, and other stationary parts or stops constructed to engage said cam-plates at the forward limit of the movement of the carriage for turning the cam-plates in the opposite direction, substantially as described.

19. The combination, with the mandrel-carriage B and clamp-bars mounted therein, of pivoted cam-plates mounted upon the carriage and engaging the ends of the clamp-bars, said cam-plates being provided with flat surfaces $q'\, q^2$, for engagement with the clamp-bars, located at unequal distances from the pivots of the cam-plates, substantially as described.

20. The combination, with the mandrel-carriage B and clamp-bars mounted therein, of pivoted cam-plates mounted upon the carriage and provided with inclined surfaces $q^3$, and stationary stops engaging said surfaces $q^3$ for turning the cam-plates, substantially as described.

21. The combination, with the machine-frame, of a carriage B, a mandrel C, mounted upon said carriage, two or more clamp-bars provided with a series of inclined slots, projections or studs upon the carriage adapted to engage said slots, and cam-plates pivoted upon the carriage and constructed to engage the ends of the said clamp-bars, substantially as described.

22. The combination, with the machine-frame, of a longitudinally-movable mandrel, a carriage sustaining the mandrel, two or more clamp-bars mounted in the carriage and movable obliquely toward and from the mandrel, pivoted arms or dogs mounted upon the machine-frame in position to engage the rear ends of said clamp-bars for releasing the latter from the mandrel, and means for actuating said arms or dogs, substantially as described.

23. The combination, with the machine-frame, of a longitudinally-movable mandrel, a carriage sustaining the mandrel, two or more clamp-bars mounted in the carriage and movable obliquely toward and from the mandrel, cam-plates mounted upon the carriage and constructed to act upon the clamp-bars to force the latter backwardly and inwardly, swinging arms or dogs mounted upon the machine-frame and constructed to act upon the rear ends of said clamp-bars for forcing the latter forwardly to release them from the mandrel, and means for actuating said swinging arms or dogs, substantially as described.

24. The combination, with the machine-frame, of a longitudinally-movable mandrel, a carriage sustaining the mandrel, two or more clamp-bars mounted in the carriage and movable obliquely toward and from the mandrel, means constructed to act upon the said clamp-bars in the forward movement of the carriage operating to thrust the said clamp-bars rearwardly and inwardly, arms or dogs mounted upon the machine-frame and constructed to act upon the rear ends of the clamp-bars for throwing the latter forward, and longitudinally-moving parts connected with the said dogs or arms and constructed for engagement with the carriage, whereby said dogs or arms will be thrown forward to release the clamp-bars from the mandrel, substantially as described.

25. The combination, with the machine-frame, of a longitudinally-movable mandrel, a carriage sustaining the mandrel, two or more clamp-bars mounted in the carriage and movable obliquely toward and from the mandrel, gibs located upon the machine-frame in position to engage the cam-plates, cam-plates mounted upon the carriage and constructed to act upon the clamp-bars to throw the latter rearwardly and inwardly, swinging arms or dogs located upon the machine-frame in advance of the gibs and constructed to act upon the rear ends of the clamp-bars to throw the latter forwardly and outwardly, and means for actuating said arms or dogs, substantially as described.

26. The combination, with the machine-frame, of a carriage B, a mandrel C, mounted upon the said carriage, two or more clamp-bars provided with a series of inclined slots, projections or studs upon the carriage engaging said slots, cam-plates mounted upon the carriage and constructed to act upon the said clamp-bars to throw the latter in one direction, swinging arms or dogs mounted upon the machine-frame and constructed to engage the said clamp-bars for moving them in the opposite direction, and means for actuating said arms or dogs, substantially as described.

27. The combination, with the machine-frame, the carriage B, mandrel C, and clamp-bars E E' E², movable obliquely toward and from the mandrel, of means for thrusting the said clamp-bars forwardly, embracing radially-arranged arms or dogs S S' S², pivoted to the machine-frame at their outer ends, sliding plates S⁴ S⁴ pivotally connected with said dogs at points inside of the pivots of the latter, springs applied to throw the said dogs backwardly, and a movable part connected with the said plates S⁴ S⁴, and constructed to engage the carriage in the forward movement of the latter, substantially as described.

28. The combination, with the machine-frame, carriage B, mandrel, and clamp-bars, of the pivoted dogs S S' S², sliding plates S⁴ S⁴, connected with and moving the dogs, springs acting upon said plates, and longitudinal rods R³ R³, connected with the plates and provided with arms $r^3 r^3$, constructed to engage the carriage, substantially as described.

29. The combination, with the carriage B, of the mandrel-support O, movable longitudinally upon the carriage, the mandrel C, connected at its rear end with said support, and a roller mounted upon the forward end of the mandrel-support and constructed to engage the under surface of the mandrel, substantially as described.

30. The combination, with the machine-frame and a mandrel, of one or more clamp-bars constructed to act against the mandrel, and a longitudinally-movable abutment-bar mounted upon the machine-frame in position to bear upon the mandrel in opposition to the action of said clamp-bars, substantially as described.

31. The combination, with the machine-frame and the mandrel C, of one or more clamp-bars constructed to act against one side of the mandrel, a longitudinally-movable abutment-bar adapted to bear against the mandrel in opposition to the action of the said clamp-bars, and a longitudinal girder N, arranged parallel with the mandrel and sustaining the said abutment-bar, substantially as described.

32. The combination, with the machine-frame and the mandrel C, of one or more clamp-bars constructed to act against one side of the mandrel, an abutment-bar located in position to bear upon the mandrel in opposition to the action of the said clamp-bars, and a longitudinally-movable slide-bar mounted upon the machine-frame and supporting the said abutment-bar, said abutment-bar being movable with relation to the slide-bar toward and from the mandrel, substantially as described.

33. The combination, with the machine-frame and the mandrel C, of one or more clamp-bars constructed to act against one side of the mandrel, an abutment-bar arranged in position to bear upon the mandrel in opposition to the action of the said clamp bar or bars, and a longitudinally-movable slide-bar sustaining the said abutment-bar, said slide-bar and abutment-bar being provided with inclined surfaces, whereby the abutment-bar will be thrown into contact with the mandrel by a relative longitudinal movement of the said slide-bar and abutment-bar, substantially as described.

34. The combination, with the machine-frame and the mandrel C, of one or more clamp-bars constructed to act against one side of the mandrel, an abutment-bar located in position to bear upon the mandrel in opposition to the action of the said clamp-bars, a longitudinally-movable slide-bar supporting the said abutment-bar, said slide-bar and abutment-bar being provided with interfitting inclined faces, a sliding plate C⁴ upon the slide-bar connected with the abutment-bar by an inclined slot and pin and an inclined or cam surface upon the said plate, and a stationary pin or roller upon the machine-frame adapted for mutual engagement in the forward movement of the slide-bar, whereby the abutment-bar is moved longitudinally upon the slide-bar for releasing the mandrel, substantially as described.

35. The combination, with the machine-frame and the mandrel C, of one or more clamp-bars constructed to act against one side of the mandrel, an abutment-bar bearing upon the mandrel in opposition to the said clamp-bars, a longitudinally-movable slide-bar supporting the abutment-bar, said slide-bar and abutment-bar being provided with interfitting inclined surfaces, a sliding plate $C^4$ upon the slide-bar connected with the abutment-bar by an inclined slot and pin, an inclined or cam surface upon the said sliding plate $C^4$, and a pin or roller upon the machine-frame, constructed for mutual engagement in the forward movement of the mandrel and slide-bar, and a stationary cam-surface upon the machine-frame, adapted to engage the said plate in the rearward movement of the mandrel and slide-bar, whereby the abutment-bar is moved longitudinally upon the slide-bar, and thereby thrown into contact with and released from the mandrel, substantially as described.

36. The combination, with the machine-frame and the mandrel C, of one or more clamp-bars constructed to act against one side of the mandrel, an abutment-bar M, a slide-bar M', supporting said abutment-bar, a girder N, sustaining and guiding the said slide-bar, and a sliding plate $C^4$ upon the slide-bar connected by an inclined slot and pin with the abutment-bar, the said abutment-bar and slide-bar being provided with interfitting inclined surfaces, and the said sliding plate being constructed to bear against an opposing surface of the girder at the time the abutment-bar is in contact with the mandrel, substantially as described.

37. The combination, with the abutment-bar M and slide-bar M', said abutment and slide bars being provided with interfitting inclined surfaces upon their adjacent edges, of plates attached to the sides of the slide-bar and overlapping the abutment-bar, said plates and the abutment-bar being connected by inclined slots and pins, whereby the abutment-bar is sustained by the slide-bar, substantially as described.

38. The combination, with the abutment-bar M and slide-bar M', said abutment and slide bars being provided with interfitting inclined surfaces, of a girder N and a sliding plate $C^4$, mounted upon the slide-bar and having an inclined slot-and-pin connection with the abutment-bar, the said girder being provided at its forward end with an inclined or cam surface constructed to engage the said sliding plate, and thereby move the said plate laterally upon the slide-bar and the abutment-bar longitudinally upon said slide-bar, substantially as described.

39. The combination, with the longitudinally-movable mandrel, the abutment-bar M, and slide-bar M', of the girder N, sustaining said slide-bar, said slide-bar M' being provided with anti-friction rollers bearing against the girder, substantially as described.

40. The combination, with the machine-frame, carriage B, and the mandrel C, of the abutment-bar M, the slide-bar M', sustaining said abutment-bar, said slide-bar being provided with a detent adapted to engage the forward end of the mandrel, and a stationary pin or projection upon the machine-frame, constructed to engage the said detent and thereby release the latter from the mandrel, substantially as described.

41. The combination, with the machine-frame, the carriage B, and the mandrel C, of the abutment-bar M and slide-bar M', sustaining said abutment-bar, the said slide-bar being provided with an arm or projection engaging a surface or shoulder at the rear end of the mandrel, whereby the slide-bar and abutment-bar are carried with the mandrel in the rearward movement of the latter, substantially as described.

42. The combination, with the machine-frame, the carriage B, and mandrel C, of the abutment-bar M and slide-bar M', sustaining said abutment-bar, said slide-bar being provided with a movable detent adapted to engage the forward end of the mandrel, and with an arm or projection adapted to engage a surface or shoulder at the rear end of the mandrel, and a stationary pin or roller engaging the said detent in the forward motion of the slide-bar, substantially as described.

43. The combination, with the machine-frame, the carriage B, and mandrel C, of the abutment-bar M, slide-bar M', girder N, and a movable detent mounted upon the slide-bar and constructed to engage the mandrel, said girder being provided with an inclined or cam surface at its forward end, constructed to engage and actuate the detent in the rearward movement of the slide-bar, and an arm or projection upon the slide-bar, constructed to engage a shoulder or projection upon the mandrel, whereby the slide-bar is carried rearwardly with the mandrel, substantially as described.

44. The combination, with the carriage B, of the mandrel-support O, mounted to slide longitudinally in the carriage, the mandrel C, sustained upon said support, a clamp-bar D, connected with the mandrel, said clamp-bar and support being provided with interfitting inclined faces, a longitudinally-sliding bar M' upon the machine-frame, provided with a detent constructed to engage the forward end of the mandrel, a detent upon the machine-frame, constructed to engage the said slide-bar to hold the mandrel from forward movement with the support O, and an arm upon the support O, having an inclined face constructed to engage the detent for releasing it from the slide-bar, substantially as described.

45. The combination, with the machine-frame, the carriage B, and a clamp bar or bars constructed to engage one side of the mandrel, of an abutment-bar bearing upon the mandrel in opposition to the said clamp-bars, other clamp-bars mounted in the carriage and constructed to act upon the mandrel at points between the clamp-bars first mentioned and the abutment-bar, a longitudinally-movable slide-bar sustaining the said abutment-bar, a movable detent upon said slide-bar, adapted to engage the mandrel, and a stationary stop or projection upon the machine-frame, constructed to engage and move the said detent for releasing the latter from the mandrel, substantially as described.

46. The combination, with the machine-frame, the carriage B, and the mandrel C, of a clamp bar or bars constructed to act against one side of the mandrel, an abutment-bar opposing the said clamp-bars, a movable slide-bar sustaining the abutment-bar, said slide-bar and abutment-bar being provided with engaging inclined surfaces, a sliding plate $C^4$, mounted upon the slide-bar and connected with the abutment-bar by an inclined slot and pin, a movable detent mounted upon the slide-bar and constructed to engage the abutment-bar, and a stationary projection upon the machine-frame, constructed to engage and move the said sliding plate and detent for releasing the abutment-bar and slide-bar from the mandrel, substantially as described.

47. The combination, with the carriage B and mandrel C, of the support O, constructed to slide longitudinally in the said carriage and provided with a standard having a T-head constructed to engage a correspondingly-shaped slot in the mandrel, a vertical bar D', secured in the mandrel and resting at its lower end upon the support O, and a wedge inserted between the lower end of the said bar D' and the said support O, and having adjustable connection with the said bar D', substantially as described.

48. The combination, with a longitudinally-movable mandrel and clamp-bars for forcing the metal blank into contact with the mandrel, of vertically-movable folders located at either side of the mandrel for bending the lateral margins of the blank about the mandrel, substantially as described.

49. The combination, with a longitudinally-movable mandrel, a carriage sustaining the mandrel, and clamp-bars mounted upon the carriage, of vertically-movable folders mounted upon the carriage and provided with cam-surfaces and stationary rollers engaging said cam-surfaces for lifting the folders, substantially as described.

50. The combination, with a longitudinally-movable mandrel, a carriage sustaining the mandrel, and clamp-bars mounted upon the carriage for forcing the metal blank into contact with the mandrel, of vertically-movable folders located at both sides of the mandrel and links connecting said folders with the carriage, pivoted to the folders and carriage, substantially as described.

51. The combination, with a longitudinally-movable mandrel, a carriage sustaining the mandrel, and clamp-bars mounted upon the carriage for forcing the metal blank into contact with the mandrel, of vertically-movable folders located at both sides of the mandrel and provided with cam-surfaces, pivoted links connecting the folders with the carriage, and stationary rollers constructed to act upon said cam-surfaces of the folders for lifting the latter, substantially as described.

52. The combination, with the machine-frame, carriage B, and mandrel C, of vertically-movable folders G G, pivoted links connecting said folders and the carriage, said links being constructed to swing in vertical planes, and rigid vertical guides upon the carriage, constructed to engage the said folders, substantially as described.

53. The combination, with a longitudinally-movable mandrel of vertically-movable folders located at either side of the mandrel, vertically-movable longitudinal bars G' G' for sustaining said folders, and obliquely-arranged links pivoted to said folders and to the said bars G' G', whereby the folders may be adjusted vertically with relation to the said bars, substantially as described.

54. The combination, with a longitudinally-movable mandrel, a carriage sustaining the mandrel, and clamp-bars mounted upon the carriage and constructed to act upon the mandrel, of vertically-movable folders mounted upon opposite sides of the mandrel, longitudinal bars G' G', having vertically-movable connection with the carriage and provided with inclined or cam surfaces, stationary rollers constructed to act upon said inclined or cam surfaces of the bars to lift the folders, and means adjustably sustaining the said folders from the bars G' G', substantially as described.

55. The combination, with the machine-frame, a carriage B, and a mandrel C, mounted to slide longitudinally upon the carriage, of clamp-bars upon the carriage for forcing the metal blank into contact with the mandrel, vertically-movable folders upon the carriage for bending the blank about the mandrel, means constructed to act upon said folders to lift the latter in the forward movement of the carriage, and stationary horizontal guides mounted upon the frame and adapted to sustain said folders in their elevated position, substantially as described.

56. The combination, with a longitudinally-movable mandrel, clamp-bars for forcing the metal blank into contact with the mandrel, and seaming devices, of a detent or stripper adapted to engage the finished tube in the rearward movement of the mandrel, and movable supports constructed to receive the finished tube from the mandrel, substantially as described.

57. The combination, with the machine-frame, of a longitudinally-movable carriage sliding thereon and a mandrel mounted upon the carriage, clamp-bars constructed to act upon the mandrel, stationary seaming devices, and movable supports for receiving the finished tube, comprising swinging arms pivoted at one side of the path of the mandrel and carriage, and means for actuating the arms in the backward movement of the carriage, embracing a cam and pin connected with said arms and with the carriage, substantially as described.

58. The combination, with a longitudinally-movable mandrel, clamp-bars for holding the sheet metal upon the mandrel, and stationary seam-folders, of means for supplying lubricant to the folders, comprising a valved tube, a movable part upon the machine-frame, constructed to engage and actuating the valve, and a part or surface moving with the mandrel and constructed to engage said movable part, so as to hold the valve open during the action of the seam-folders, substantially as described.

59. The combination, with the machine-frame, a longitudinally - movable carriage mounted thereon, a mandrel supported upon the carriage, clamp-bars mounted upon the carriage and constructed to engage the mandrel, and stationary seam-folders upon the machine-frame, of an oil-supply pipe provided with a valve, a vertically-movable bar mounted upon the machine-frame and connected with and adapted to actuate the valve, a weighted dog $u^3$, pivoted to the lower end of said slide-bar, and a longitudinally-arranged rib $u^4$, attached to the carriage and constructed to engage the said dog $u^3$, substantially as described.

60. The combination, with the carriage B and mandrel C, mounted thereon, of driving-connections for actuating the carriage, embracing a clutch, and means for actuating the clutch to stop the carriage at the forward limit of its movement, consisting of a longitudinal rod W′, a pivoted lever W$^4$, connected with said rod, and a rod W$^5$, connected with said lever W$^4$ and provided with an inwardly-bent end $w^4$, and a projection or lug $w^5$ upon the carriage, constructed to engage said end $w^4$, substantially as described.

61. The combination, with the carriage B and mandrel C, of means for actuating the carriage, embracing a clutch device, and means for automatically actuating said clutch device to stop the carriage, embracing a rod W′, a pivoted lever W$^4$, connected with the rod W′ and provided with a prong $w^6$, a pivoted dog W$^7$, mounted upon the carriage and constructed to engage the said prong $w^6$, a spring adapted to hold said dog in position to engage the prong, means constructed to engage said dog for holding the latter free from the prong to allow the actuation of the lever W$^4$ for starting the carriage forward, and a hand-lever connected with the said rod W′, substantially as described.

62. The combination, with the carriage B and an actuating-gear for the said carriage, embracing a clutch, of a rod W′, a lever W$^4$, provided with a prong $w^6$, a dog W$^7$, a spring adapted to hold said dog in position to engage the prong, a longitudinally-movable bar V$^4$, a spring-detent $v'$, mounted upon said bar, said detent being constructed to engage and actuate the said dog W$^7$, a spring-lever V$^5$, pivoted upon the machine-frame and constructed to engage the dog, and a striker V$^6$, mounted upon the carriage in position to engage said lever V$^5$, substantially as described.

63. The combination, with the carriage B, mandrel C, and actuating devices for driving the carriage, embracing a clutch, of driving devices for moving the mandrel, embracing a belt-shifter, a rod W′, connected with the clutch of the carriage-actuating device, a lever W$^4$, connected with said rod and provided with a prong $w^6$, a pivoted dog W$^7$, mounted upon the carriage and constructed to engage said prong $w^6$, an arm or bar V$^4$, attached to said belt-shifter, a spring-detent $v'$, mounted upon said arm V$^4$ and constructed to engage said pivoted dog, a spring-lever V$^5$, mounted upon the machine-frame and constructed to engage said detent $v'$, and a striker V$^6$ upon the carriage, constructed to engage said lever V$^5$, substantially as described.

64. The combination, with the machine-frame, the carriage B, and mandrel C, of actuating devices for driving the carriage, embracing a reversing-gear, and a clutch controlling the same, of a rod W′, connected with the clutch, a lever W$^4$, connected with said rod and provided with prongs $w^6$ and $w^7$, a pivoted dog W$^7$, mounted upon the carriage and adapted to engage both of said prongs $w^6$ and $w^7$, a spring constructed to hold the dog in position to engage the prong $w^6$, and means for actuating said dog to free it from the prong $w^6$ in the forward movement of the carriage, substantially as described.

65. The combination, with the carriage B, the mandrel, and means for actuating the carriage, embracing a clutch, of means for actuating the said clutch, comprising a rod W′, a pivoted lever W$^4$, provided with a prong $w^6$, a dog W$^7$, pivoted upon the carriage, a spring constructed to hold said dog in position to engage the prong, a longitudinally-movable bar V$^4$, mounted upon the machine-frame, a spring-detent $v'$, mounted on the said bar and constructed to engage the said dog for turning the latter about its pivot, a spring-lever V$^5$, constructed to engage said detent $v'$, and a wiper V$^6$, attached to the carriage and constructed to engage said lever V$^5$, said wiper being provided with an inwardly and rearwardly inclined surface for engaging said lever V$^5$ in the rearward movement of the carriage, substantially as described.

66. The combination, with the machine-frame, the carriage B, and mandrel C, of the slide-bar M', a detent $C^3$, a slide-bar $C^4$, carrying said detent, a pin or roller upon the machine-frame, constructed to engage and move said slide-bar $C^4$ in the forward movement of the mandrel, and a yielding part having frictional engagement with said slide-bar $C^4$ for temporarily holding the latter from backward movement, substantially as described.

67. The combination, with the machine-frame and the carriage B, of the mandrel C, movable longitudinally upon the carriage, clamp-bars mounted upon the carriage, and a stop for limiting the forward movement of the mandrel upon the carriage, substantially as described.

68. The combination, with the machine-frame, the carriage B, and mandrel C, of the mandrel-support O, movable relatively to the mandrel, a clamp-bar D, connected with the mandrel, the clamp-bar and support being provided with interfitting inclined faces, whereby the clamp-bar will be thrown into contact with the mandrel by a relative movement of the clamp-bar and mandrel-support, means applied to the mandrel-support for moving the same together with the mandrel, and a stop upon the carriage constructed to engage the mandrel for limiting the forward movement of the said mandrel upon the carriage, substantially as described.

In testimony that I claim the foregoing as my invention I affix my signature in presence of two witnesses.

ORLANDO P. BRIGGS.

Witnesses:
  C. CLARENCE POOLE,
  O. N. WILLIS.